United States Patent
Andersson et al.

(10) Patent No.: US 11,089,320 B2
(45) Date of Patent: Aug. 10, 2021

(54) ADAPTIVE PIXEL SAMPLING ORDER FOR TEMPORALLY DENSE RENDERING

(71) Applicant: NVIDIA Corp., Santa Clara, CA (US)

(72) Inventors: Johan Pontus Andersson, Lund (SE); Jim Nilsson, Lund (SE); Tomas Guy Akenine-Möller, Lund (SE)

(73) Assignee: NVIDIA Corp., Santa Clara, CA (US)

( * ) Notice: Subject to any disclaimer, the term of this patent is extended or adjusted under 35 U.S.C. 154(b) by 0 days.

(21) Appl. No.: 16/830,656

(22) Filed: Mar. 26, 2020

(65) Prior Publication Data
US 2020/0314442 A1    Oct. 1, 2020

Related U.S. Application Data

(60) Provisional application No. 62/824,590, filed on Mar. 27, 2019.

(51) Int. Cl.
*H04N 19/132* (2014.01)
*H04N 19/513* (2014.01)
*G06T 15/06* (2011.01)
*H04N 19/423* (2014.01)
*H04N 19/182* (2014.01)

(52) U.S. Cl.
CPC .......... *H04N 19/513* (2014.11); *G06T 15/06* (2013.01); *H04N 19/132* (2014.11); *H04N 19/182* (2014.11); *H04N 19/423* (2014.11)

(58) Field of Classification Search
None
See application file for complete search history.

(56) References Cited

U.S. PATENT DOCUMENTS

| | | | | |
|---|---|---|---|---|
| 2002/0175942 A1* | 11/2002 | Seitz, Jr. | ............ | D06B 11/0059 715/764 |
| 2003/0058244 A1* | 3/2003 | Ramani | ................... | G06T 11/40 345/440 |
| 2005/0116918 A1* | 6/2005 | Shin | ...................... | G09G 3/3208 345/100 |
| 2005/0119867 A1* | 6/2005 | Shin | ...................... | G09G 3/3283 702/189 |
| 2017/0293995 A1* | 10/2017 | Saleh | .................... | G06T 15/005 |
| 2020/0143550 A1* | 5/2020 | Golas | .................... | G06T 3/4023 |

OTHER PUBLICATIONS

Alexander Keller and Wolfgang Heidrich, "Interleaved Sampling," Eurographics Workshop on Rendering Techniques, pp. 269-276, 2001.

Anjul Patney., Marco Salvi, Joohwan Kim, Anton Kaplanyan, Chris Wyman, Nir Benty, David Luebke, Aaron Lefohn, "Towards Foveated Rendering for Gaze-tracked Virtual Reality", ACM Transactions on Graphics 35, 6, pp. 179:1-179:12, (2016).

Barbara T. Sweet, "The Impact of Motion-Induced Blur on Out-the-Window Visual System Performance," Proceedings of IMAGE, 2007.

(Continued)

*Primary Examiner* — Christopher G Findley
(74) *Attorney, Agent, or Firm* — Rowan TELS LLC

(57) ABSTRACT

A method dynamically selects one of a first sampling order and a second sampling order for a ray trace of pixels in a tile where the selection is based on a motion vector for the tile. The sampling order may be a bowtie pattern or an hourglass pattern.

24 Claims, 17 Drawing Sheets

(56) References Cited

OTHER PUBLICATIONS

Bishop, Gary, et al., "Frameless Rendering: Double Buffering Considered Harmful," Proceedings of SIGGRAPH 94, pp. 175-176, 1994.

Graham Wihlidal, "4K Checkerboard in Battlefield 1 and Mass Effect Andromeda," Game Developers Conference, 2017. 1 of 3 pp. 1-50.

Graham Wihlidal, "4K Checkerboard in Battlefield 1 and Mass Effect Andromeda," Game Developers Conference, 2017. 2 of 3 pp. 51-100.

Graham Wihlidal, "4K Checkerboard in Battlefield 1 and Mass Effect Andromeda," Game Developers Conference, 2017. 3 of 3 pp. 101-154.

Piotr Didyk, Elmar Eisemann, Tobias Ritschel, Karol Myszkowski, and Hans-Peter Seidel, "Perceptually-motivated Real-time Temporal Upsampling of 3D Content for High-refresh-rate Displays," Computer Graphics Forum, vol. 29, No. 2, pp. 713-722, 2010.

\* cited by examiner

ADAPTIVE PIXEL SAMPLING ORDER FOR TEMPORALLY DENSE RENDERING

CROSS-REFERENCE TO RELATED APPLICATIONS

This application claims priority and benefit of U.S. provisional application Ser. No. 62/824,590, titled "ADAPTIVE PATTERN SELECTION FOR TEMPORALLY DENSE RENDERING", filed on Mar. 27, 2019, the contents of which are incorporated herein by reference in their entirety.

BACKGROUND

Ray tracing for computer generated imagery has become a dominant algorithm for use in film and is growing in popularity for real-time application such as virtual reality. While ray tracing is becoming more accessible to real-time applications, more performance is desirable, particularly to hit the high refresh rates utilized in performance-critical applications.

Frameless rendering is a technique in which each ray or sample is assigned a unique time. While frameless rendering performs well at providing continuous updates of a world simulation, it requires running the world simulation for each sample taken. A more efficient solution is an approach such as interleaved sampling to cover the spatial sampling desired over some number of frames, each of which uses samples from pseudo-random positions. These samples are combined using accumulation buffering to produce final frames for display. A variant of this approach called temporal antialiasing (TAA) uses regular subpixel offsets and accumulates samples over many frames. TAA uses a variety of heuristics, often tuned per application, to reduce blurring, ghosting, and other artifacts.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 1 depicts pixel layouts 100 in accordance with one embodiment.

DETAILED DESCRIPTION

Figure 2:
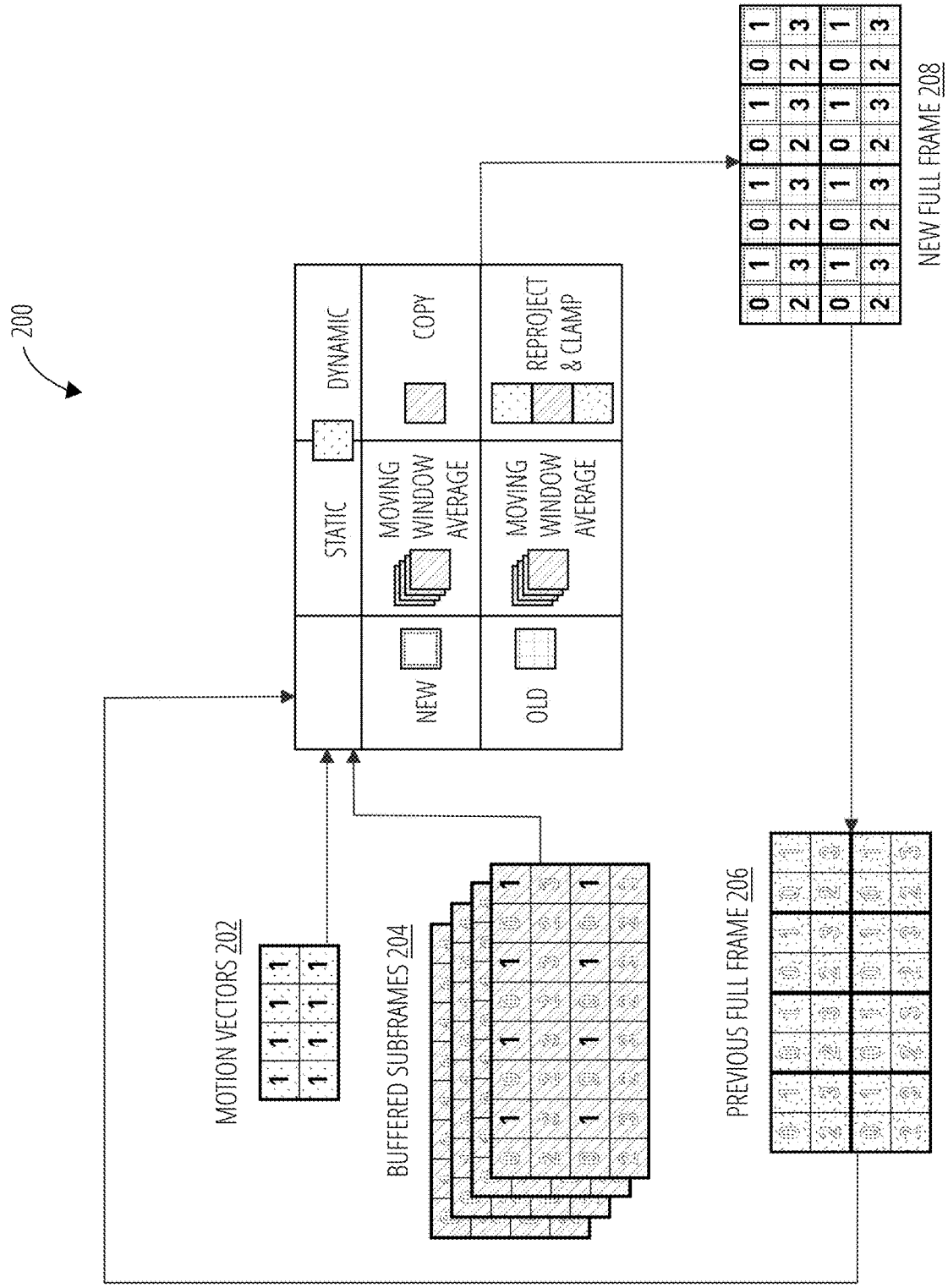
FIG. 2 depicts a frame generation pipeline 200 in accordance with one embodiment.

This disclosure makes reference to several techniques including ray tracing, pixel sampling, supersampling, displaying, and rendering. Ray tracing refers to a class of well known algorithms that direct rays from a viewpoint through pixels into a scene that is to be depicted on a machine display. The depiction of the scene is referred to as "displaying" the scene. Before a scene is displayed, it is rendered, meaning that a pixelated image of the scene is generated in machine memory, for example in a display buffer memory. The rendered image may use more than one ray per pixel, commonly known as supersampling. A "frame" or "video frame" is a full set of the pixels over multiple subframes, where a "subframe" refers to the subset of pixels in the full frame that are sampled per iteration of a rendering algorithm. A "tile" is a subset of pixels in a frame and a "block" is a set of multiple tiles.

One way to improve rendering speed for ray traced graphics is to reduce the spatial sampling rate on rendered images, e.g., re-render only one pixel out of every tile of 2×2 pixels in each rendered frame, while utilizing an increased frame rate. For example, instead of rendering each frame at full resolution, the rendering may update only a fourth of the pixels per frame, and can thus execute at a rendering speed of, up to, 4 times faster. This can be generalized to any tiles size, e.g., 4×4 pixels. The same amount of rendering work is performed but is spatially sparse (spread out over more frames) and temporally dense (frames are generated at a faster rate). In some embodiments a technique known in the art as "Whitted" ray tracing may be utilized. Whitted ray tracing enables the generation of reflections and is less computationally complex than path tracing and other methods.

Figure 1:
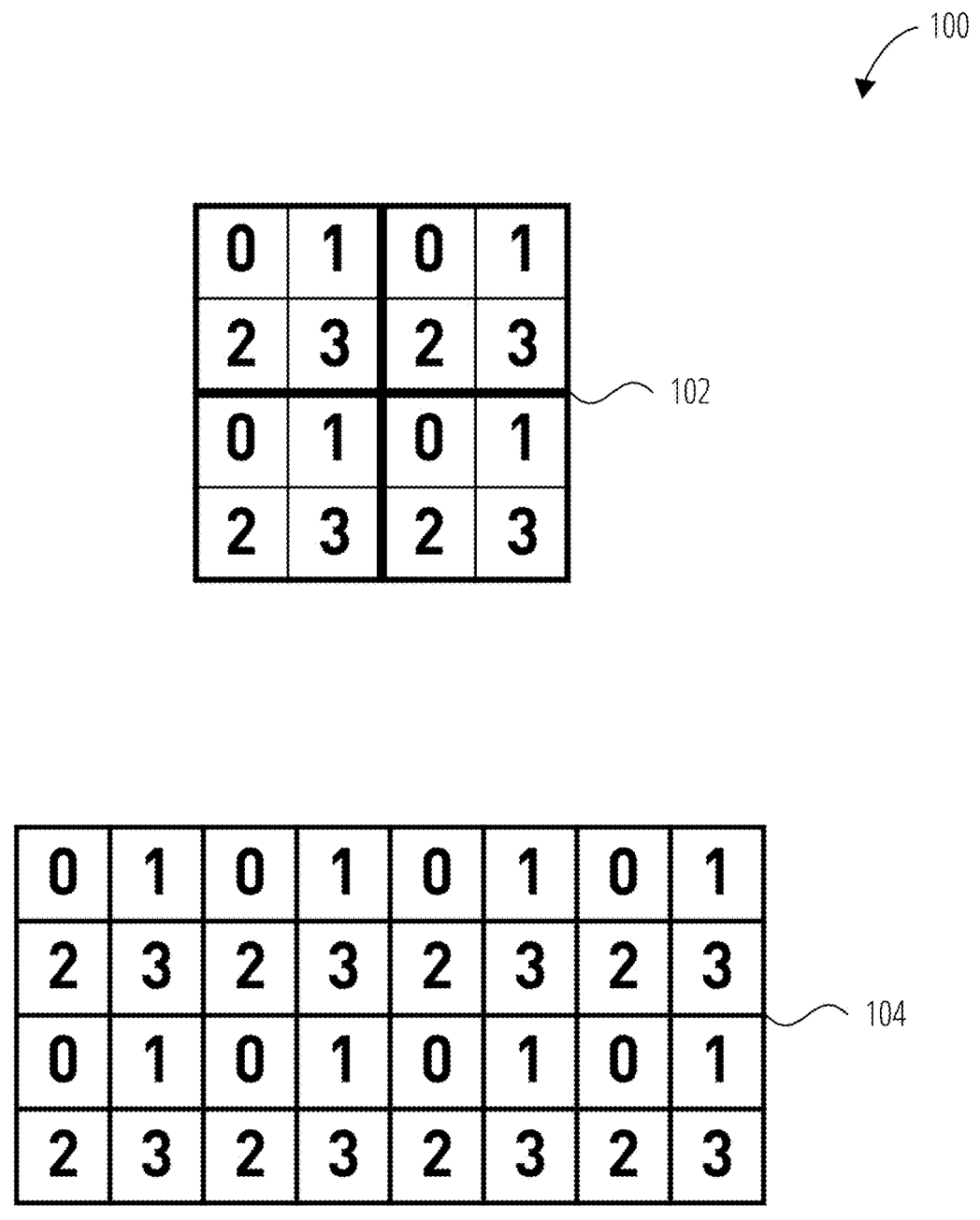

The following description utilizes an example of sampling one pixel position in each 2×2 tile of pixels in each rendered frame over four frames per rendering cycle. However the technique may be generalized to sampling N pixels in each W×H tile per frame. In the block 102 of the pixel layouts 100 in FIG. 1, the pixels in position 0 of each tile are sampled in a first frame, followed by sampling pixels in position 1 in the subsequent frame, and so on, resulting in a frame in which all pixels have been sampled after four iterations. The pixel ordering per tile does not need to follow the one depicted in FIG. 1. Each or some of the four 2×2 tiles in the block 102 could also have be sampled in a different ordering from the others, but to simplify the example assume each tile has the ordering shown in block 102 of FIG. 1.

A set of all pixels sampled in each one of the four iterations is called a subframe. Four subframes are thus created over the four iterations. Each subframe itself does not contain sufficient information to reconstruct a full resolution frame of desired quality. Therefore to compose a new full resolution frame, a current subframe may be complemented with pixels from prior subframes (for example, up to fifteen prior computed subframes), as well as with the previous full resolution frame.

Next consider the block 104 of 8×4=32 pixels depicted in FIG. 1. Each pixel in a 2×2 pixel tile is assigned a number between 0 and 3. Instead of rendering to all 8×4 pixels every frame, which is the conventional approach, rendering may be performed in i subframe increments where (i mod 4)==0. That is, first render 0-numbered pixels to a first subframe, then render 1-numbered pixels to a second subframe, then render 2-numbered pixels to a third subframe, and then render 3-numbered pixels to a fourth subframe. After that, start over by rendering the 0-numbered pixels again, and so on. A full resolution frame is obtained after four frames.

Applying the same sampling ordering to each tile is straightforward to implement, but in a general may result in noticeable visual artifacts, such as flickering. The per-tile sampling order may be randomized for each iteration, but this can result in a situation in which some pixels are not rendered even after four (more generally, i) frames. To mitigate these drawbacks the sampling pattern of each tile may be varied dynamically based on the motion of pixels within each frame.

A frame generation pipeline 200 is depicted at a high level in the FIG. 2. The pipeline utilizes ray tracing of subframes and motion vector generation to create the full resolution output frame with reduced jagged line and other aliasing effects. Motion vectors 202, buffered subframes 204, and a previous full frame 206 are analyzed to classify pixels as static or dynamic as well as new or old, and a new full frame 208 is generated based on these inputs and classifications. The classification of pixels as new or old and dynamic or static is described in detail at a later point. A subframe is rendered at lower resolution than the final frame while retrieving motion vectors for the pixels of the subframe. The subframe together with the previously rendered subframes, and the previously rendered full frame, are then used to composite the final frame to display. For each pixel that is to be rendered in the final frame the frame generation pipeline 200 determines if its content is static or dynamic, and whether or not it corresponds to one of the pixels that were most recently ray traced (new pixels) or not (old pixels). Based on this determination, as indicated by the center box, different composition methods are used, possibly using the previously rendered full frame as input. Black numbers in buffers indicate values that are updated during this frame, while gray numbers indicate information retained from previous frames. Finally, the currently rendered frame is copied to the previous full frame's buffer.

Figure 3:
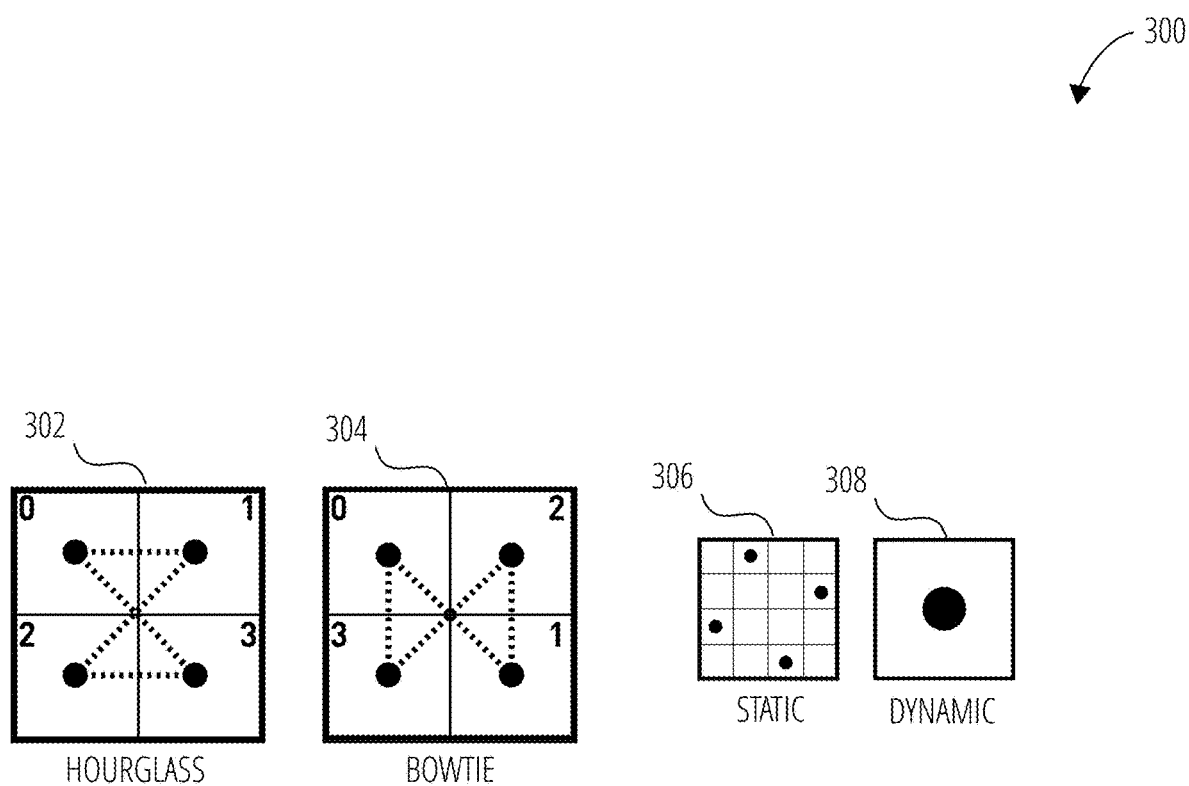
FIG. 3 depicts per-tile sampling orders 300 in accordance with one embodiment.
Figure 4:
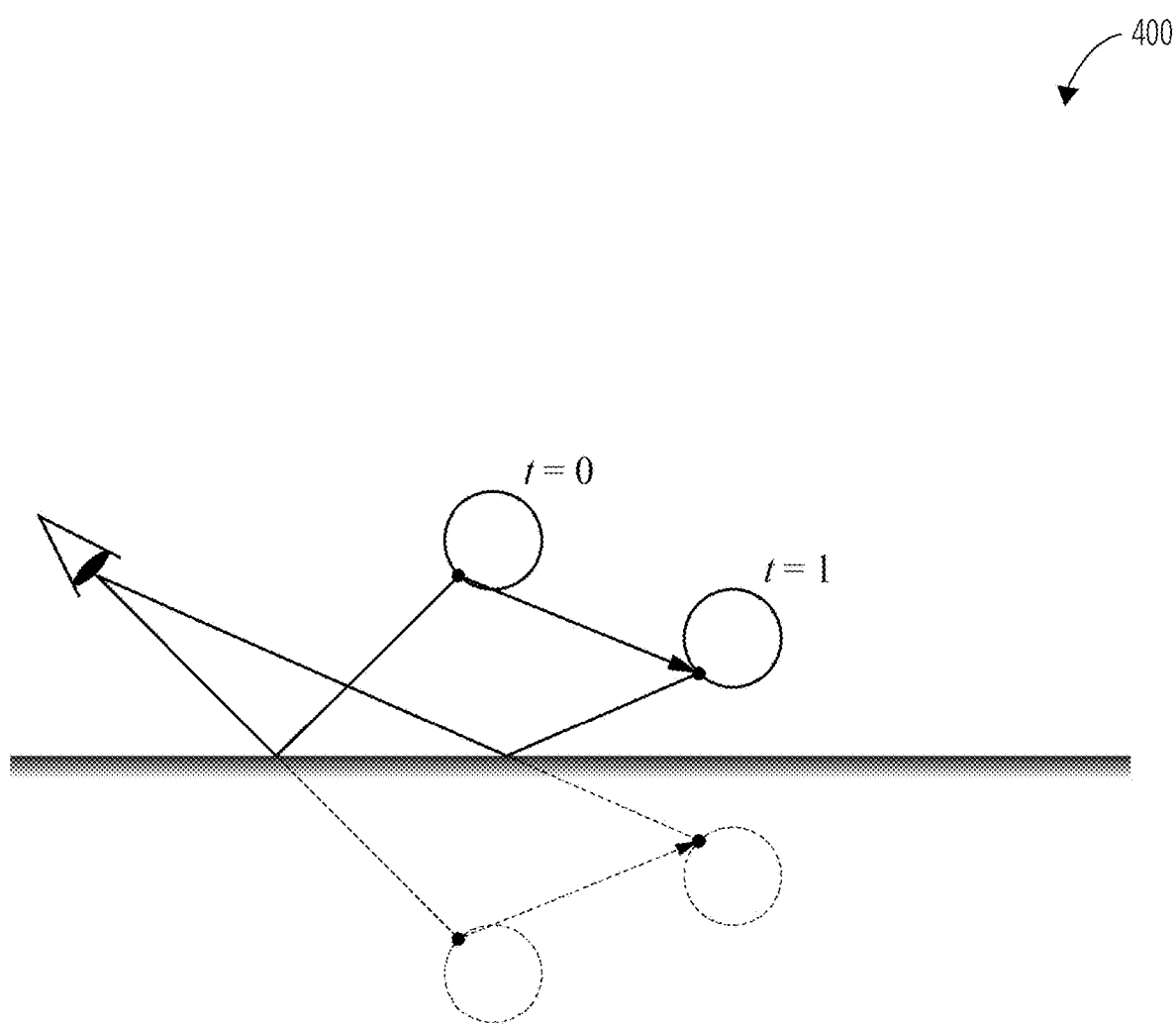
FIG. 4 depicts reflection ray tracing 400 in accordance with one embodiment.

Pixel orderings and per-pixel sampling patterns 300 are depicted in FIG. 3. The sampling order in a W×H dimensioned tile may selected from any set of desired patterns that provides a positive effect in different situations. The choice of the pattern may be determined from the motion vectors and the pixel neighborhood. In one embodiment, over four subframes, the pixels in each 2×2 tile are sampled in either an hourglass pixel sampling order 302 or a bowtie pixel sampling order 304. The choice of which order to use for a particular tile is dynamically determined based on motion of the nearby pixels. Choosing the sampling order dynamically per tile has a positive impact on the perceived visual quality of the generated frames. Algorithms for selecting the per-tile sampling order are explained in detail at a later point.

This decision on which ordering to use for each tile is made once every four subframes (generally, N subframes where N is the number of pixel samples in the per-tile sampling order) in one embodiment. Thus a full frame is sampled before updating the per-tile sampling order for rendering the next frame. The patterns to the right in FIG. 3 are the sampling patterns used per pixel in one embodiment. A static jitter pattern 306 may be utilized to supersample pixels classified as static, and a centric-heavy pattern 308 (ray or rays directed preponderantly to the center of the supersampling region) is used for pixels classified as dynamic.

For static pixels the jitter pattern may be held constant for a plurality (e.g., four, or generally N) subframes. Whenever the camera viewpoint changes or motion is detected the pixel's average is reset and reprojection is employed. For dynamic pixels, averaging and jitter are disabled together. The process will then only sample in pixels' center region in order to avoid the viewer experiencing a stuttering image. The flexibility inherent in ray tracing enables variation of the sampling pattern on a per-pixel basis.

A moving window averaging approach may be utilized to reduce the aliasing of pixels whose content is static. The color of static pixels may be determined by averaging a number of samples. The actual number of samples that are averaged may depend on how long (over how many frames) the pixel has remained static. This approach effectively results in 4x (generally Nx) supersampling-antialiasing. Limiting the window length to four sub-frames bounds the amount of temporal information accumulated in the average, enabling the realistic rendering of scenes with illumination that varies over time.

In one embodiment, a pixel is classified as dynamic if the longest screen-space (in the coordinate frame of the displayed frame) motion vector M in a neighborhood of the pixel is non-zero. This neighborhood is chosen to be the tile the pixel is in as well as the surrounding eight tiles. Each of those nine tiles has a motion vector corresponding to that tile's new pixel. If the longest of those nine motion vectors is non-zero, the pixel is classified as dynamic. This classification function improves detection of motion in areas of the image comprising multiple moving features. A pixel is classified as new if it is included in the most recently rendered subframe. Pixels that are both new and dynamic are stored into the frame buffer. Pixels that are not new (and hence are classified as old) and that are also dynamic are re-projected and color clamped. The longest motion vector M may be used to identify where the old, dynamic pixel is located in the previous full frame, and the pixel is resampled from that location via a bilinear filter. Variance sampling or another technique (e.g., such as min-max RBG computation) may be applied to compute an axis-aligned bounding box in color space to which to clamp the re-projected pixel. The bounding box may be based on the current pixel's immediate neighbors that are also included in the most recently sampled subframe.

Figure 5:
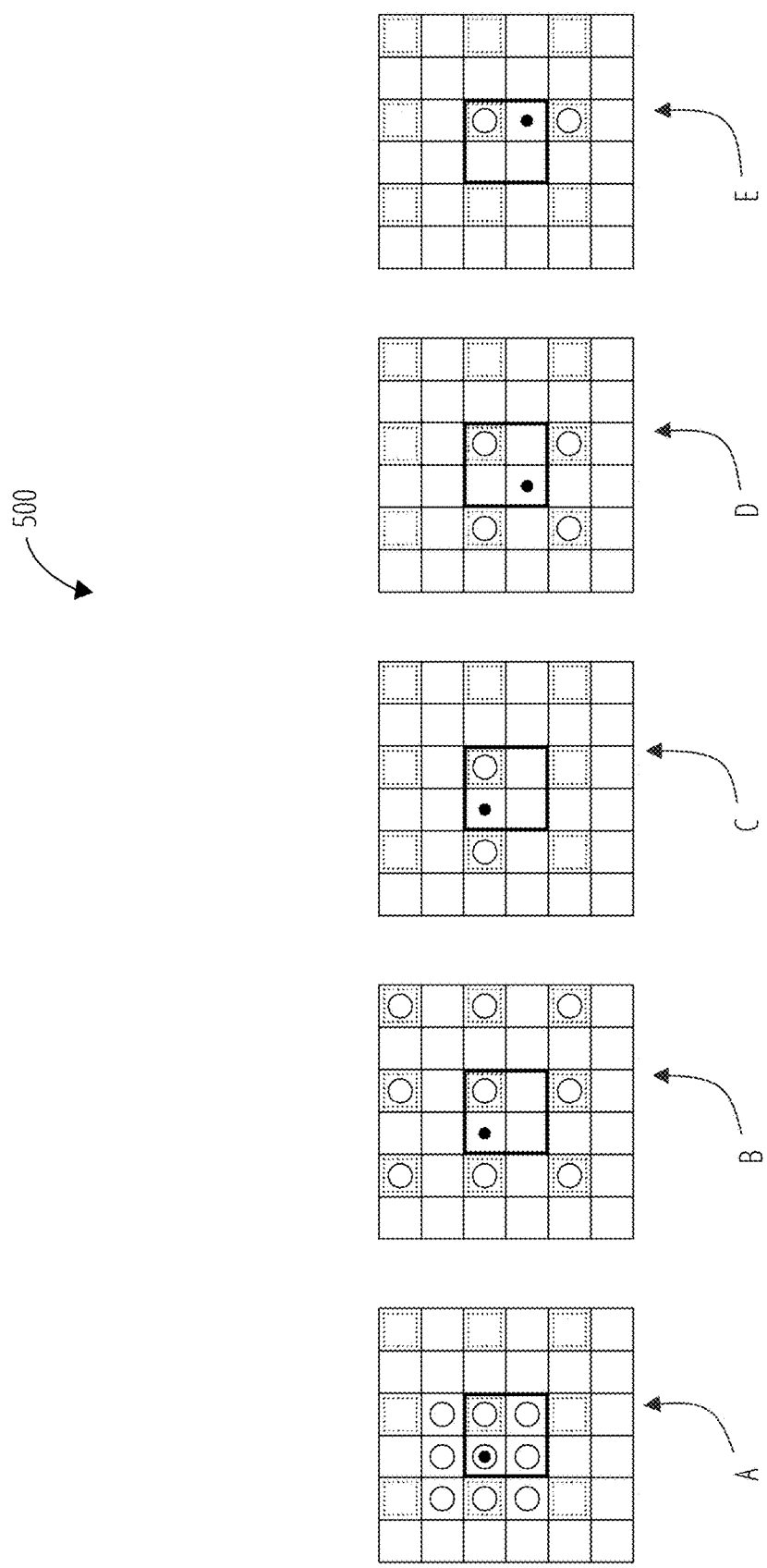
FIG. 5 depicts pixels 500 used during variance sampling (open circles) of a given pixel (solid dot) in a tile (bold square), in accordance with one embodiment.

FIG. 5 depicts pixels 500 used during variance sampling (open circles) of a given pixel (solid dot) in a tile (dark square). Pixels from the green (lightly shaded) regions are retrieved from the most recently rendered subframe. Map A depicts the situation where all immediate neighbors of the pixel are used to compute the axis-aligned bounding box. Map B depicts the situation in which the pixels from a 3×3 area of the most recently rendered subframe are used to compute the axis-aligned bounding box. Maps C, D, and E depict the situation in which only the immediate, most recently rendered, neighboring pixels are used to compute the bounding box. These may all be used in one embodiment.

The use of all immediate neighbors in the variance sampling may improve the estimate at the expense of reusing old information, which may degrade results. Utilizing a 3×3 sample area of the most recent subframe may result in fringes in the final frame. The use of Maps C, D, and E results in fewer pixels being used in the variance sampling (two or four compared to nine). This removes much of the fringes seen from the use of Maps A and B.

The choice of each tile's sampling order (see FIG. 3), e.g., hourglass or bowtie, has a noticeable effect on how the resulting display sequences are perceived. Choosing the correct ordering may reduce spatiotemporal aliasing effects such as flickering and crawling pixels. An algorithmic function, g, may be utilized which determines each tile's pixel ordering for a sequence of subframes on a per-tile basis. In one embodiment the function g inputs the tile's motion m=($m_x$, $m_y$) and pixel contents P. In another embodiment the input to g is limited to the tile's motion. Equation 1 represents these approaches:

$$\hat{g}(m) \approx g(m,P) \in \{\text{hourglass, bowtie}\} \quad \text{Equation 1}$$

The tile's motion characteristic may be determined in the same manner as determining that a tile's contents are static or dynamic. The function ĝ computes the length l of the motion vector, removing its integer part and yielding:

$$\ell_f = \ell - \lfloor \ell \rfloor, \ell = \|m\| \quad \text{Equation 2}$$

The integer part is removed because basing the decision on the absolute motion itself may prove insufficient.

The function ĝ determines the motion's direction a relative to the x-axis as:

$$\alpha = \text{atan } 2(m_y, m_x) \quad \text{Equation 3}$$

The function ĝ may be represented in terms of the length of the motion vector and the angle as:

$$\hat{g}(\ell_f, \alpha)$$

For horizontal motion without any vertical component i.e., when α=0, ĝ may implement the following selection criterion for the tile sampling order:

$$\hat{g}(\ell_f, \alpha) = \begin{cases} \text{hourglass} & \text{if } \ell_f \in (0.25, 0.75), \\ \text{bowtie} & \text{otherwise} \end{cases} \quad \text{Equation 4}$$

Figure 6:
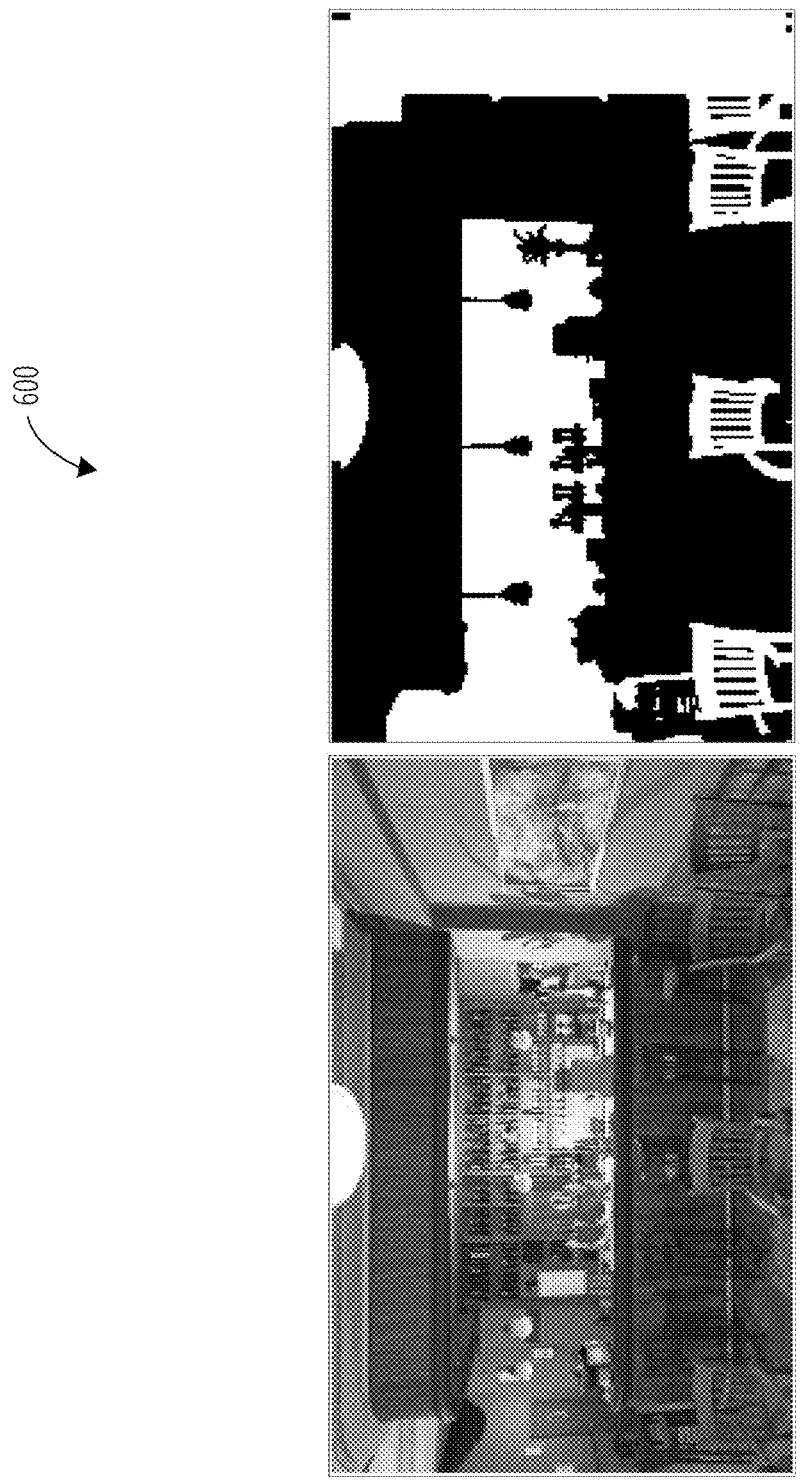
FIG. 6 depicts scene segmentation 600 in accordance with one embodiment.
Figure 7:
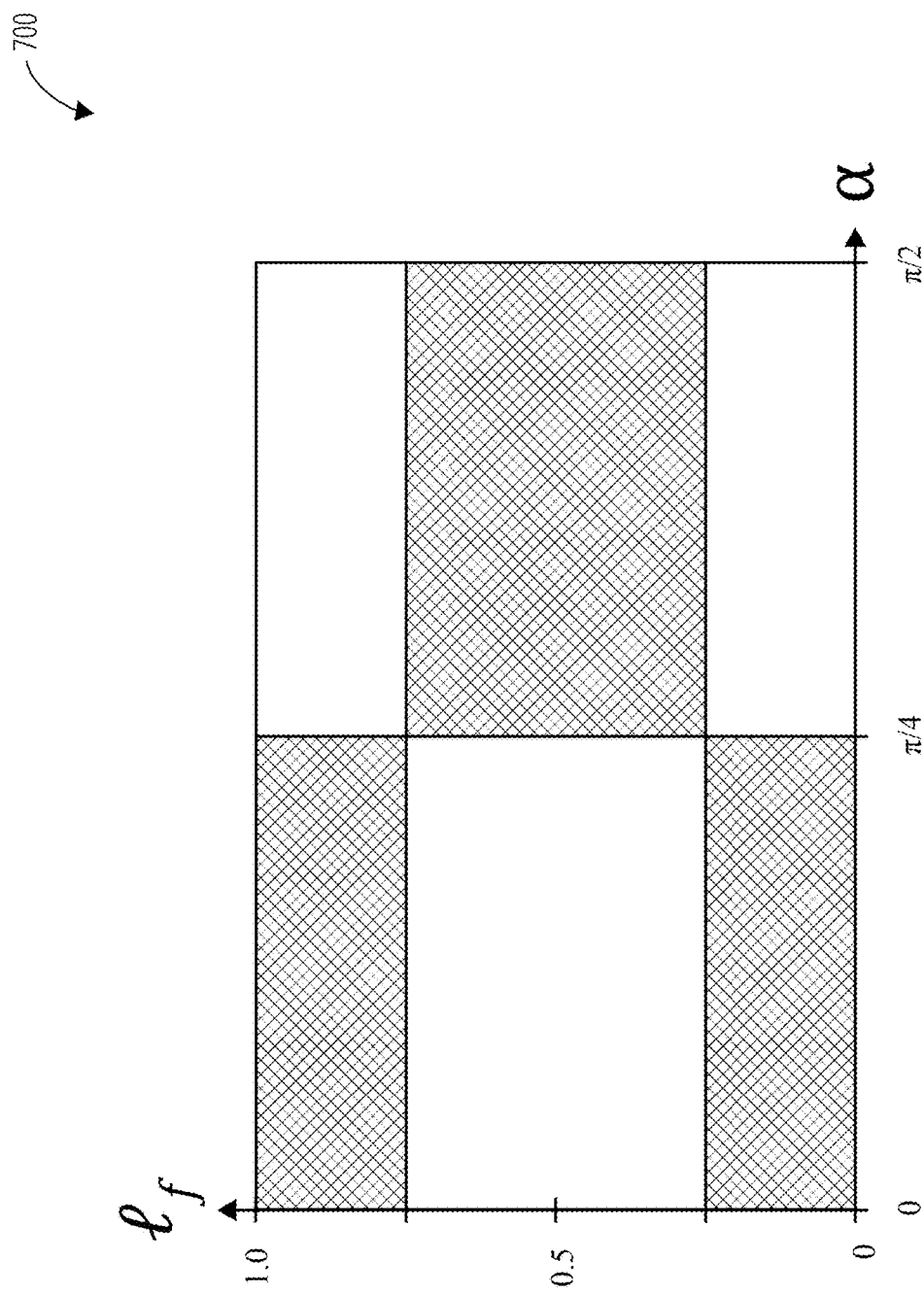
FIG. 7 depicts a pixel ordering algorithm 700 in accordance with one embodiment.

The function ĝ thus effectively segments the scene into different regions, basing the pixel ordering decision on what produces a favorable visual experience. This segmentation is graphically depicted in the scene segmentation 600 of FIG. 6. When the camera is moving and the hourglass ordering is applied for all tiles, the beer taps on the bar would flicker, but not the glasses and bottles on the shelves. If the bowtie ordering was always applied instead, the situation would be reversed. The per-tile orderings dynamically chosen with function ĝ render those parts of the scene with fewer such artifacts. The function ĝ also selects the proper orderings for depicting the chairs and foreground elements of the scene.

For vertical motion without any horizontal component where $$\alpha \in \{-\frac{\pi}{2}, \frac{\pi}{2}\}$$

ĝ may implement the following selection criterion for the tile sampling order:

$$\hat{g}(\ell_f, \alpha) = \begin{cases} \text{hourglass} & \text{if } \ell_f \in [0, 0.25] \cup [0.75, 1], \\ \text{bowtie} & \text{otherwise} \end{cases} \quad \text{Equation 5}$$

FIG. 7 through FIG. 10 depict different alternatives for how to choose per-tile pixel ordering based on the fractional part ($l_f$) of the motion vector length and the motion angle α. Yellow color indicates that the hourglass pattern should be chosen, blue color indicates the bowtie pattern, and green indicates that the choice between the two is randomized. The alternative depicted in FIG. 10 may be utilized.

One option is to choose either of the bowtie or hourglass ordering based on which of the x and y component of the motion vector is dominant. This selection method is visualized in the pixel ordering algorithm 700 of FIG. 7. For this and alternative selection methods the function ĝ is depicted in the drawings in the interval $$\alpha \in \left[0, \frac{\pi}{2}\right]$$

with symmetry applied to cover the remainder of possible motion angles. The approach depicted in FIG. 7, i.e., basing the choice of per-tile sample ordering on the dominant motion direction, may be unsatisfactory. Instead, smoother transitions may be applied as depicted in FIG. 8 and FIG. 9 both show continuous transitions between the two solutions at α=0 and α=π/2.

Figure 8:
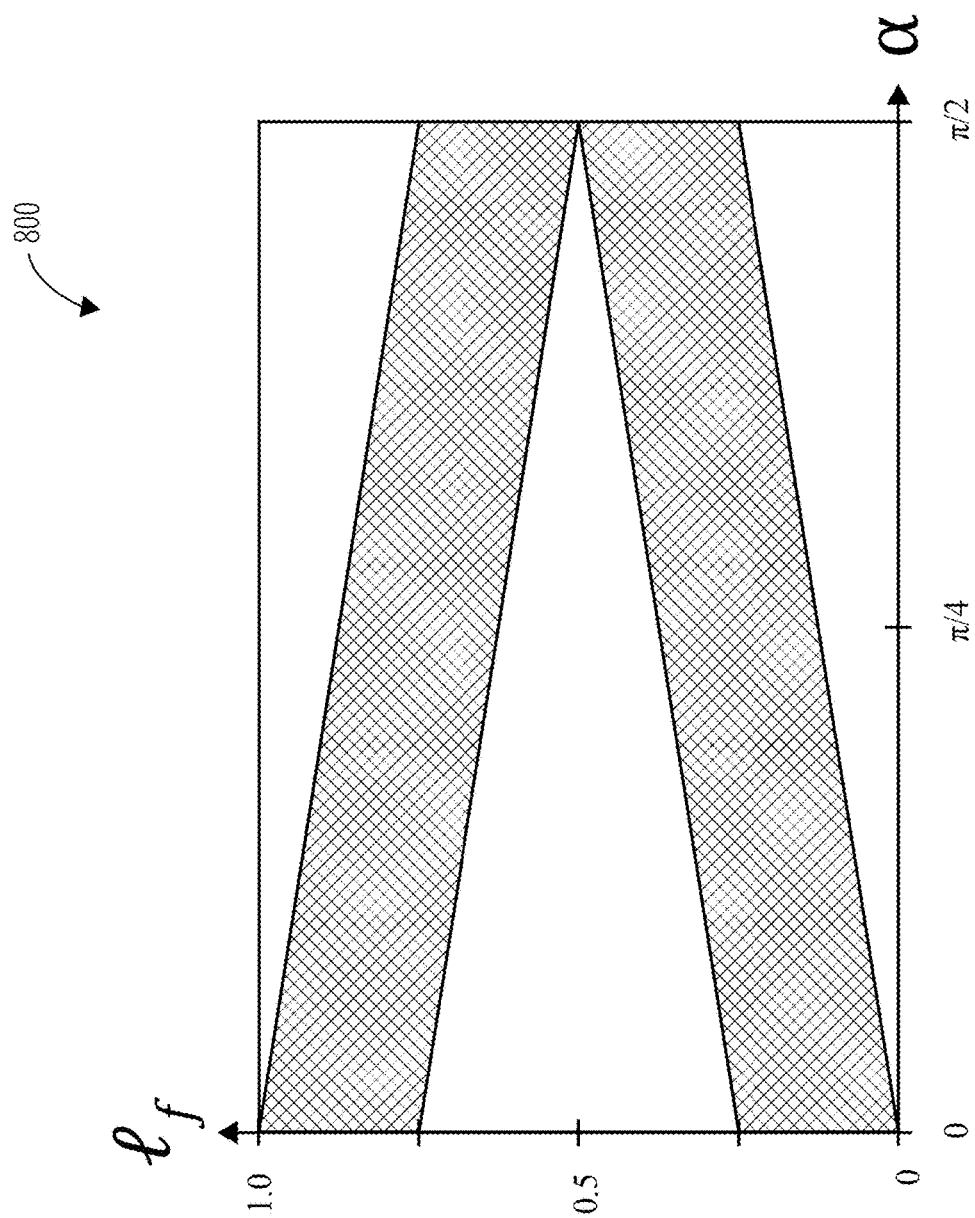
FIG. 8 depicts a pixel ordering algorithm 800 in accordance with another embodiment.

The pixel ordering algorithm 800 depicted in FIG. 8 may be preferable when:

$$\alpha \in \left[0, \frac{\pi}{4} - \gamma\right], \gamma = \frac{\pi}{40}$$

Figure 9:
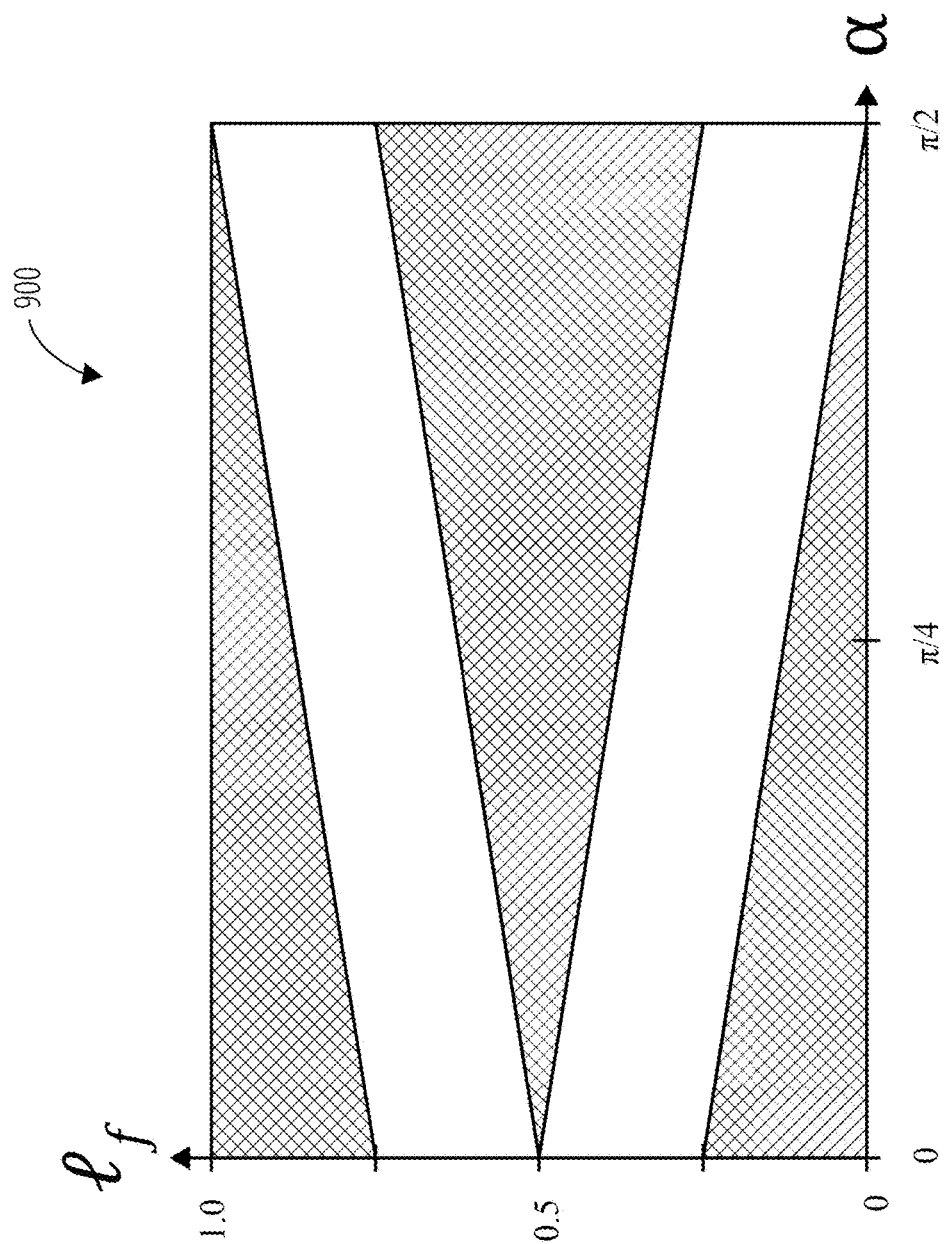
FIG. 9 depicts a pixel ordering algorithm 900 in accordance with yet another embodiment.
Figure 10:
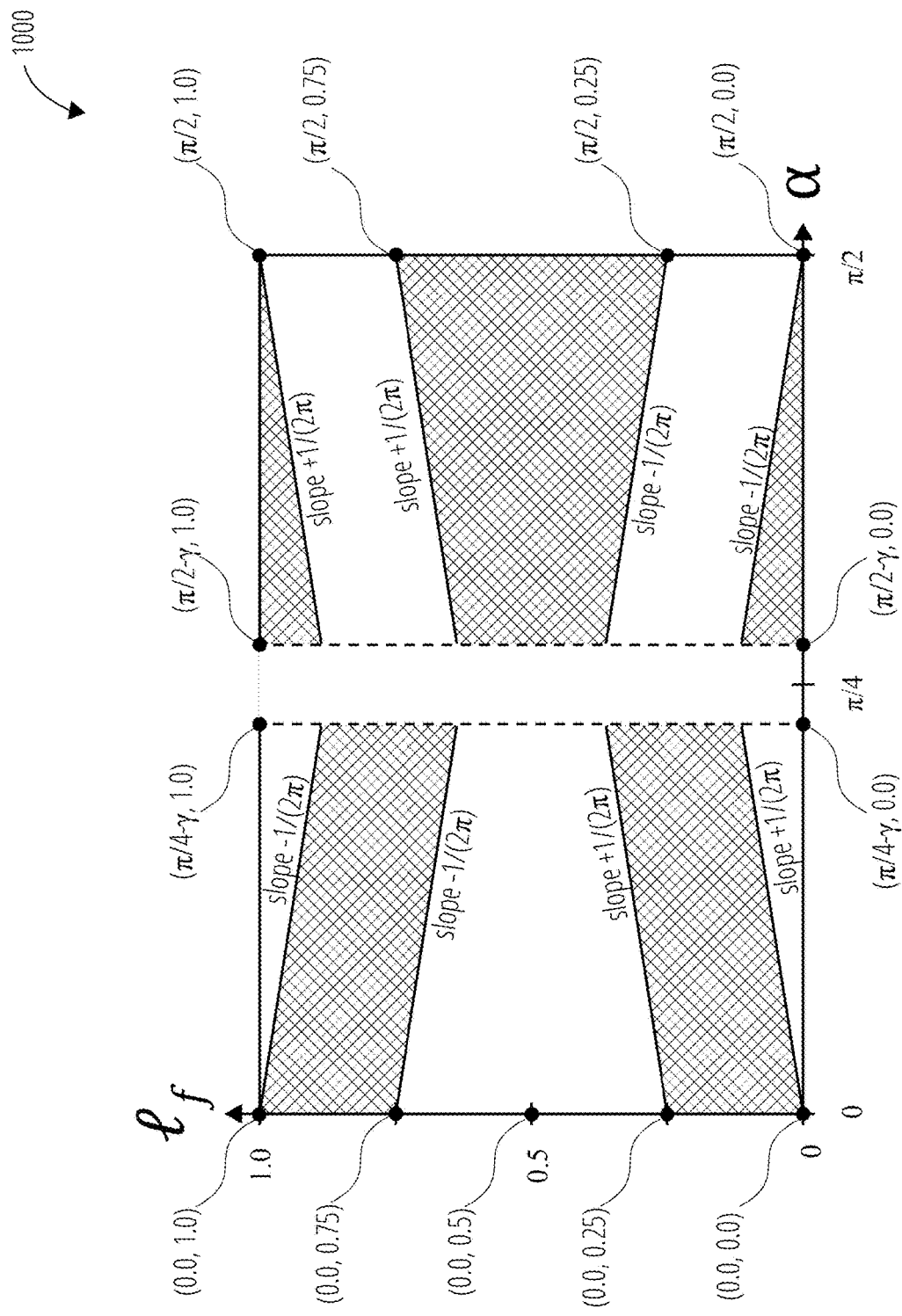
FIG. 10 depicts a pixel ordering algorithm 1000 in accordance with yet another embodiment.

The pixel ordering algorithm 900 depicted in FIG. 9 may provide the best results when:

$$\alpha \in \left[\frac{\pi}{4} + \gamma, \frac{\pi}{2}\right] \gamma = \frac{\pi}{40}$$

Between those intervals, i.e., for the conditions:

$$\alpha \in \left[\frac{\pi}{4} - \gamma, \frac{\pi}{4} + \gamma\right] \gamma = \frac{\pi}{40}$$

the pixel ordering algorithm 800 and the pixel ordering algorithm 900 may result in noticeable aliasing in different parts of the scene. To mitigate this, the pattern choice in that interval may be randomized. The dynamic pixel ordering algorithm 1000 depicted in FIG. 10 may thus be utilized. The constant (e.g., π/40) may be varied by implementation or by profiling the image content and/or motion behavior of the video or particular frames of the video.

The algorithms and techniques disclosed herein (e.g., frame generation pipeline 200 and/or aspects thereof, pixel ordering algorithm 700, pixel ordering algorithm 800, pixel ordering algorithm 900, and/or pixel ordering algorithm 1000) may be executed by computing devices utilizing one or more graphic processing unit (GPU) and/or general purpose data processor (e.g., a 'central processing unit or CPU). Exemplary architectures are now described that may be configured to carry out the techniques disclosed herein on such devices.

The following description may use certain acronyms and abbreviations as follows:
"DPC" refers to a "data processing cluster";
"GPC" refers to a "general processing cluster";
"I/O" refers to a "input/output";
"L1 cache" refers to "level one cache";
"L2 cache" refers to "level two cache";
"LSU" refers to a "load/store unit";
"MMU" refers to a "memory management unit";
"MPC" refers to an "M-pipe controller";
"PPU" refers to a "parallel processing unit";
"PROP" refers to a "pre-raster operations unit";
"ROP" refers to a "raster operations";
"SFU" refers to a "special function unit";
"SM" refers to a "streaming multiprocessor";
"Viewport SCC" refers to "viewport scale, cull, and clip";
"WDX" refers to a "work distribution crossbar"; and
"XBar" refers to a "crossbar".

Parallel Processing Unit

Figure 11:
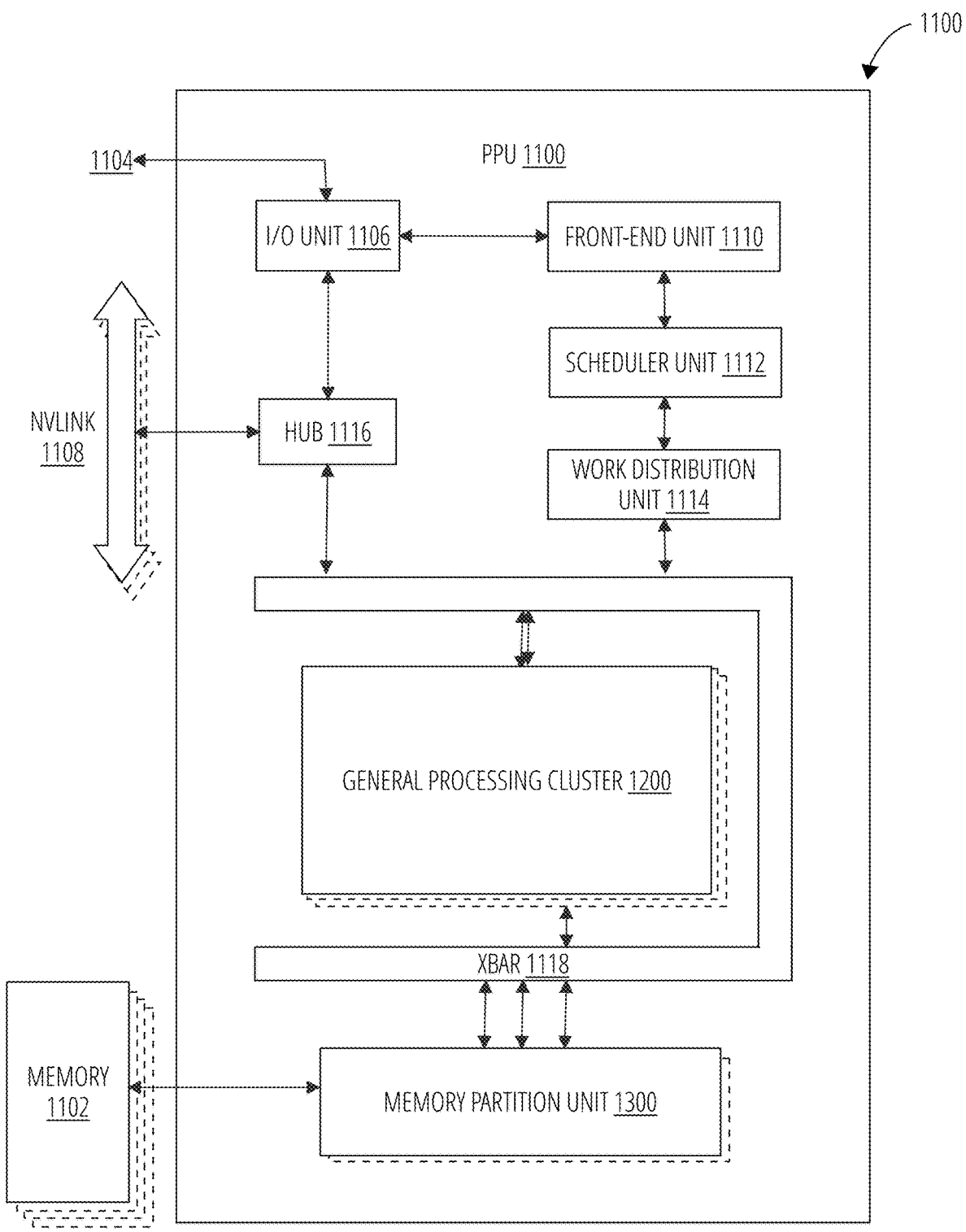
FIG. 11 depicts a parallel processing unit 1100 in accordance with one embodiment.

FIG. 11 depicts a parallel processing unit 1100, in accordance with an embodiment. In an embodiment, the parallel processing unit 1100 is a multi-threaded processor that is implemented on one or more integrated circuit devices. The parallel processing unit 1100 is a latency hiding architecture designed to process many threads in parallel. A thread (e.g., a thread of execution) is an instantiation of a set of instructions configured to be executed by the parallel processing unit 1100. In an embodiment, the parallel processing unit 1100 is a graphics processing unit (GPU) configured to implement a graphics rendering pipeline for processing three-dimensional (3D) graphics data in order to generate two-dimensional (2D) image data for display on a display device such as a liquid crystal display (LCD) device. In other embodiments, the parallel processing unit 1100 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

One or more parallel processing unit 1100 modules may be configured to accelerate thousands of High Performance Computing (HPC), data center, and machine learning applications. The parallel processing unit 1100 may be configured to accelerate numerous deep learning systems and applications including autonomous vehicle platforms, deep learning, high-accuracy speech, image, and text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and the like.

As shown in FIG. 11, the parallel processing unit 1100 includes an I/O unit 1106, a front-end unit 1110, a scheduler unit 1112, a work distribution unit 1114, a hub 1116, a crossbar 1118, one or more general processing cluster 1200 modules, and one or more memory partition unit 1300 modules. The parallel processing unit 1100 may be connected to a host processor or other parallel processing unit 1100 modules via one or more high-speed NVLink 1108 interconnects. The parallel processing unit 1100 may be connected to a host processor or other peripheral devices via an interconnect 1104. The parallel processing unit 1100 may also be connected to a local memory comprising a number of memory 1102 devices. In an embodiment, the local memory may comprise a number of dynamic random access memory (DRAM) devices. The DRAM devices may be configured as a high-bandwidth memory (HBM) subsystem, with multiple DRAM dies stacked within each device. The memory 1102 may comprise logic to configure the parallel processing unit 1100 to carry out aspects of the techniques disclosed herein.

The NVLink 1108 interconnect enables systems to scale and include one or more parallel processing unit 1100 modules combined with one or more CPUs, supports cache coherence between the parallel processing unit 1100 modules and CPUs, and CPU mastering. Data and/or commands may be transmitted by the NVLink 1108 through the hub 1116 to/from other units of the parallel processing unit 1100 such as one or more copy engines, a video encoder, a video decoder, a power management unit, etc. (not explicitly shown). The NVLink 1108 is described in more detail in conjunction with FIG. 15.

The I/O unit 1106 is configured to transmit and receive communications (e.g., commands, data, etc.) from a host processor (not shown) over the interconnect 1104. The I/O unit 1106 may communicate with the host processor directly via the interconnect 1104 or through one or more intermediate devices such as a memory bridge. In an embodiment, the I/O unit 1106 may communicate with one or more other processors, such as one or more parallel processing unit 1100 modules via the interconnect 1104. In an embodiment, the I/O unit 1106 implements a Peripheral Component Interconnect Express (PCIe) interface for communications over a PCIe bus and the interconnect 1104 is a PCIe bus. In alternative embodiments, the I/O unit 1106 may implement other types of well-known interfaces for communicating with external devices.

The I/O unit 1106 decodes packets received via the interconnect 1104. In an embodiment, the packets represent commands configured to cause the parallel processing unit 1100 to perform various operations. The I/O unit 1106 transmits the decoded commands to various other units of the parallel processing unit 1100 as the commands may specify. For example, some commands may be transmitted to the front-end unit 1110. Other commands may be transmitted to the hub 1116 or other units of the parallel processing unit 1100 such as one or more copy engines, a video encoder, a video decoder, a power management unit, etc. (not explicitly shown). In other words, the I/O unit 1106 is configured to route communications between and among the various logical units of the parallel processing unit 1100.

In an embodiment, a program executed by the host processor encodes a command stream in a buffer that provides workloads to the parallel processing unit 1100 for processing. A workload may comprise several instructions and data to be processed by those instructions. The buffer is a region in a memory that is accessible (e.g., read/write) by both the host processor and the parallel processing unit 1100. For example, the I/O unit 1106 may be configured to access the buffer in a system memory connected to the interconnect 1104 via memory requests transmitted over the interconnect 1104. In an embodiment, the host processor writes the command stream to the buffer and then transmits a pointer to the start of the command stream to the parallel processing unit 1100. The front-end unit 1110 receives pointers to one or more command streams. The front-end unit 1110 manages the one or more streams, reading commands from the streams and forwarding commands to the various units of the parallel processing unit 1100.

The front-end unit 1110 is coupled to a scheduler unit 1112 that configures the various general processing cluster 1200 modules to process tasks defined by the one or more streams. The scheduler unit 1112 is configured to track state information related to the various tasks managed by the scheduler unit 1112. The state may indicate which general processing cluster 1200 a task is assigned to, whether the task is active or inactive, a priority level associated with the task, and so forth. The scheduler unit 1112 manages the execution of a plurality of tasks on the one or more general processing cluster 1200 modules.

The scheduler unit 1112 is coupled to a work distribution unit 1114 that is configured to dispatch tasks for execution on the general processing cluster 1200 modules. The work distribution unit 1114 may track a number of scheduled tasks received from the scheduler unit 1112. In an embodiment, the work distribution unit 1114 manages a pending task pool and an active task pool for each of the general processing cluster 1200 modules. The pending task pool may comprise a number of slots (e.g., 32 slots) that contain tasks assigned to be processed by a particular general processing cluster 1200. The active task pool may comprise a number of slots (e.g., 4 slots) for tasks that are actively being processed by the general processing cluster 1200 modules. As a general processing cluster 1200 finishes the execution of a task, that task is evicted from the active task pool for the general processing cluster 1200 and one of the other tasks from the pending task pool is selected and scheduled for execution on the general processing cluster 1200. If an active task has been idle on the general processing cluster 1200, such as while waiting for a data dependency to be resolved, then the active task may be evicted from the general processing cluster 1200 and returned to the pending task pool while another task in the pending task pool is selected and scheduled for execution on the general processing cluster 1200.

The work distribution unit 1114 communicates with the one or more general processing cluster 1200 modules via crossbar 1118. The crossbar 1118 is an interconnect network that couples many of the units of the parallel processing unit 1100 to other units of the parallel processing unit 1100. For example, the crossbar 1118 may be configured to couple the work distribution unit 1114 to a particular general processing cluster 1200. Although not shown explicitly, one or more other units of the parallel processing unit 1100 may also be connected to the crossbar 1118 via the hub 1116.

The tasks are managed by the scheduler unit 1112 and dispatched to a general processing cluster 1200 by the work distribution unit 1114. The general processing cluster 1200 is configured to process the task and generate results. The results may be consumed by other tasks within the general processing cluster 1200, routed to a different general processing cluster 1200 via the crossbar 1118, or stored in the memory 1102. The results can be written to the memory 1102 via the memory partition unit 1300 modules, which implement a memory interface for reading and writing data to/from the memory 1102. The results can be transmitted to another parallel processing unit 1100 or CPU via the NVLink 1108. In an embodiment, the parallel processing unit 1100 includes a number U of memory partition unit 1300 modules that is equal to the number of separate and distinct memory 1102 devices coupled to the parallel processing unit 1100. A memory partition unit 1300 will be described in more detail below in conjunction with FIG. 13.

In an embodiment, a host processor executes a driver kernel that implements an application programming interface (API) that enables one or more applications executing on the host processor to schedule operations for execution on the parallel processing unit 1100. In an embodiment, multiple compute applications are simultaneously executed by the parallel processing unit 1100 and the parallel processing unit 1100 provides isolation, quality of service (QoS), and independent address spaces for the multiple compute applications. An application may generate instructions (e.g., API calls) that cause the driver kernel to generate one or more tasks for execution by the parallel processing unit 1100. The driver kernel outputs tasks to one or more streams being processed by the parallel processing unit 1100. Each task may comprise one or more groups of related threads, referred to herein as a warp. In an embodiment, a warp comprises 32 related threads that may be executed in parallel. Cooperating threads may refer to a plurality of threads including instructions to perform the task and that may exchange data through shared memory. Threads and cooperating threads are described in more detail in conjunction with FIG. 14.

Figure 12:
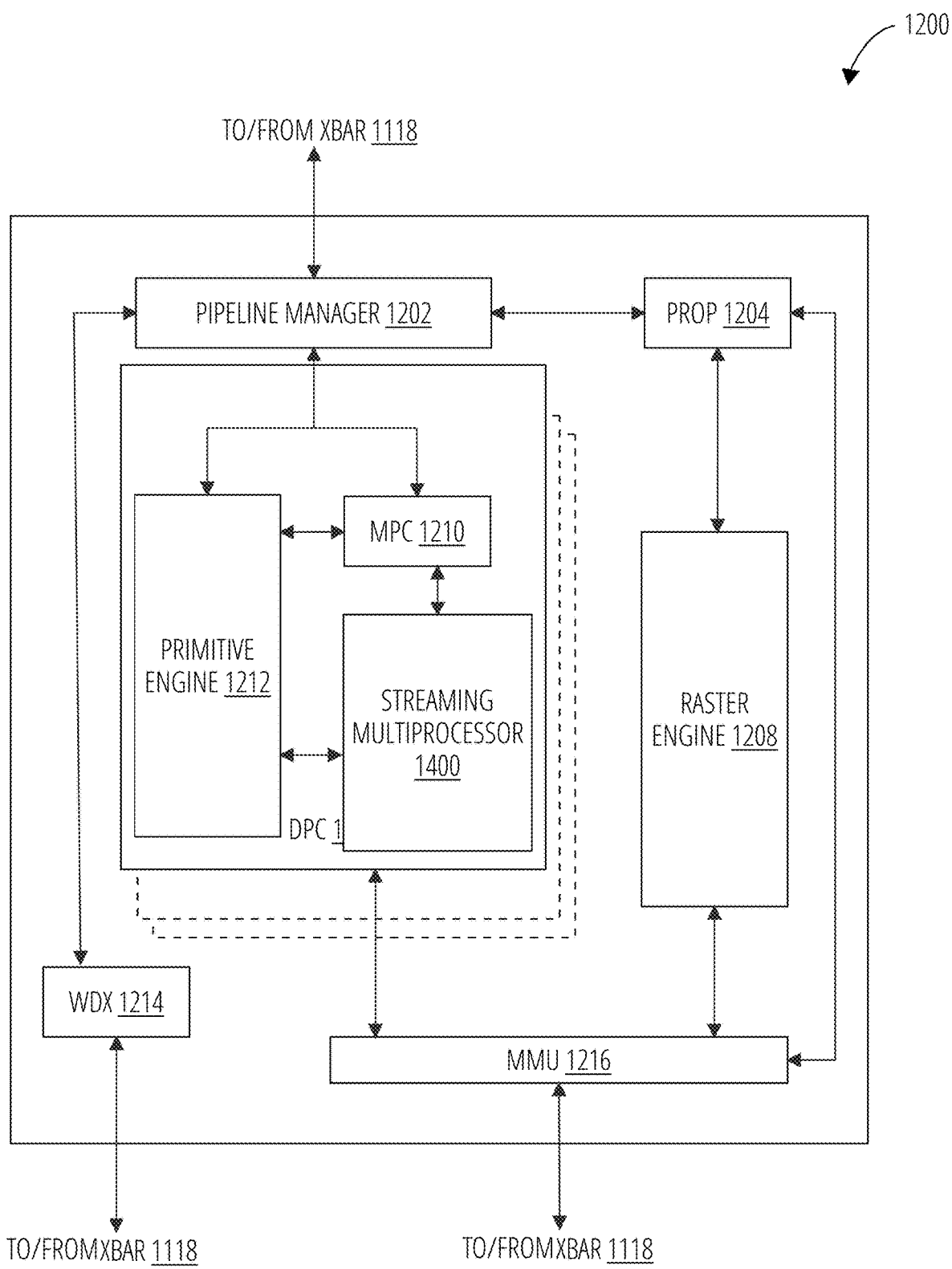
FIG. 12 depicts a general processing cluster 1200 in accordance with one embodiment.

FIG. 12 depicts a general processing cluster 1200 of the parallel processing unit 1100 of FIG. 11, in accordance with an embodiment. As shown in FIG. 12, each general processing cluster 1200 includes a number of hardware units for processing tasks. In an embodiment, each general processing cluster 1200 includes a pipeline manager 1202, a pre-raster operations unit 1204, a raster engine 1208, a work distribution crossbar 1214, a memory management unit 1216, and one or more data processing cluster 1206. It will be appreciated that the general processing cluster 1200 of FIG. 12 may include other hardware units in lieu of or in addition to the units shown in FIG. 12.

In an embodiment, the operation of the general processing cluster 1200 is controlled by the pipeline manager 1202. The pipeline manager 1202 manages the configuration of the one or more data processing cluster 1206 modules for processing tasks allocated to the general processing cluster 1200. In an embodiment, the pipeline manager 1202 may configure at least one of the one or more data processing cluster 1206 modules to implement at least a portion of a graphics rendering pipeline. For example, a data processing cluster 1206 may be configured to execute a vertex shader program on the programmable streaming multiprocessor 1400. The pipeline manager 1202 may also be configured to route packets received from the work distribution unit 1114 to the appropriate logical units within the general processing cluster 1200. For example, some packets may be routed to fixed function hardware units in the pre-raster operations unit 1204 and/or raster engine 1208 while other packets may be routed to the data processing cluster 1206 modules for processing by the primitive engine 1212 or the streaming multiprocessor 1400. In an embodiment, the pipeline manager 1202 may configure at least one of the one or more data processing cluster 1206 modules to implement a neural network model and/or a computing pipeline.

Figure 13:
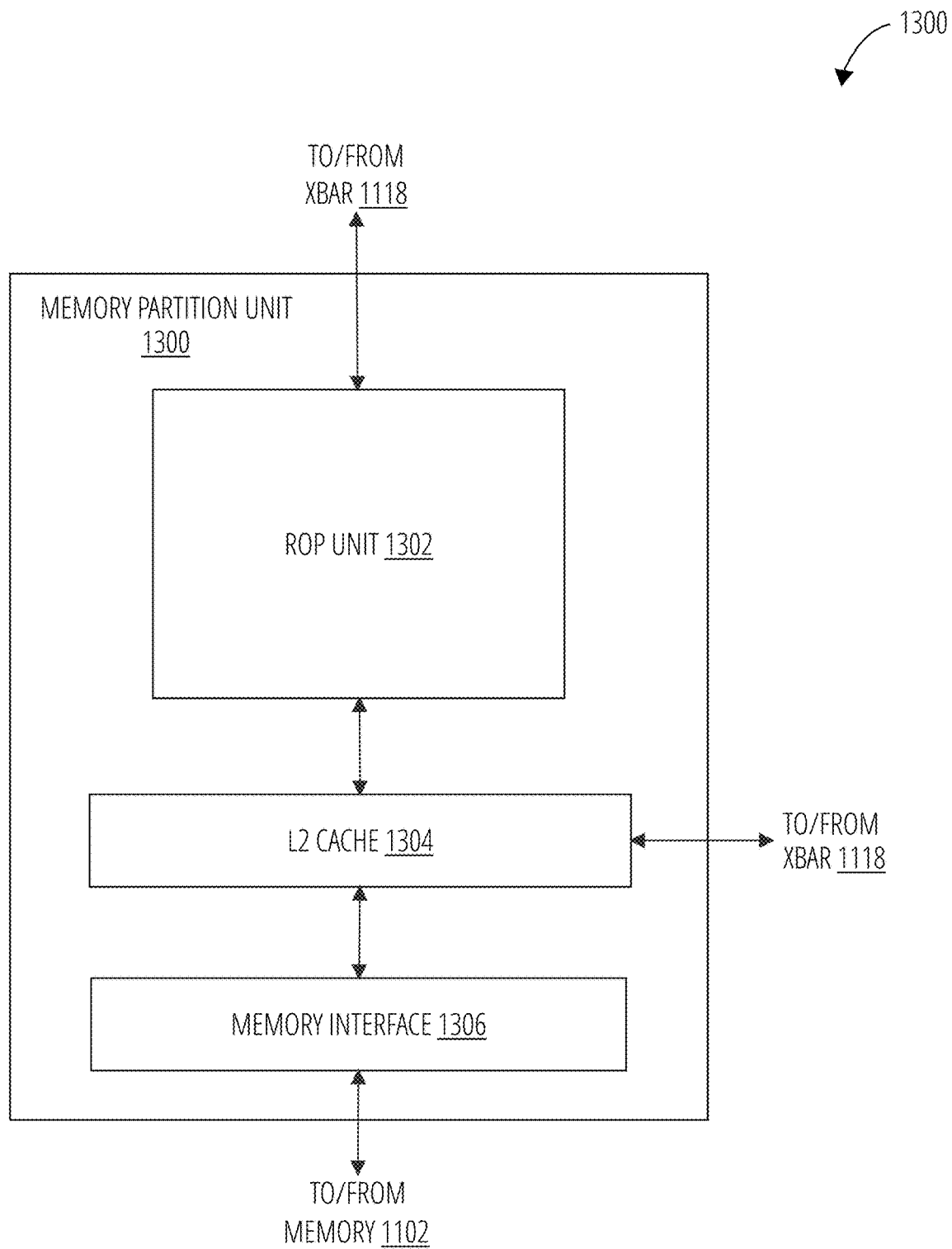
FIG. 13 depicts a memory partition unit 1300 in accordance with one embodiment.

The pre-raster operations unit 1204 is configured to route data generated by the raster engine 1208 and the data processing cluster 1206 modules to a Raster Operations (ROP) unit, described in more detail in conjunction with FIG. 13. The pre-raster operations unit 1204 may also be configured to perform optimizations for color blending, organize pixel data, perform address translations, and the like.

The raster engine 1208 includes a number of fixed function hardware units configured to perform various raster operations. In an embodiment, the raster engine 1208 includes a setup engine, a coarse raster engine, a culling engine, a clipping engine, a fine raster engine, and a tile coalescing engine. The setup engine receives transformed vertices and generates plane equations associated with the geometric primitive defined by the vertices. The plane equations are transmitted to the coarse raster engine to generate coverage information (e.g., an x, y coverage mask for a tile) for the primitive. The output of the coarse raster engine is transmitted to the culling engine where fragments associated with the primitive that fail a z-test are culled, and transmitted to a clipping engine where fragments lying outside a viewing frustum are clipped. Those fragments that survive clipping and culling may be passed to the fine raster engine to generate attributes for the pixel fragments based on the plane equations generated by the setup engine. The output of the raster engine 1208 comprises fragments to be processed, for example, by a fragment shader implemented within a data processing cluster 1206.

Each data processing cluster 1206 included in the general processing cluster 1200 includes an M-pipe controller 1210, a primitive engine 1212, and one or more streaming multi-processor 1400 modules. The M-pipe controller 1210 controls the operation of the data processing cluster 1206, routing packets received from the pipeline manager 1202 to the appropriate units in the data processing cluster 1206. For example, packets associated with a vertex may be routed to the primitive engine 1212, which is configured to fetch vertex attributes associated with the vertex from the memory 1102. In contrast, packets associated with a shader program may be transmitted to the streaming multiprocessor 1400.

The streaming multiprocessor 1400 comprises a programmable streaming processor that is configured to process tasks represented by a number of threads. Each streaming multiprocessor 1400 is multi-threaded and configured to execute a plurality of threads (e.g., 32 threads) from a particular group of threads concurrently. In an embodiment, the streaming multiprocessor 1400 implements a Single-Instruction, Multiple-Data (SIMD) architecture where each thread in a group of threads (e.g., a warp) is configured to process a different set of data based on the same set of instructions. All threads in the group of threads execute the same instructions. In another embodiment, the streaming multiprocessor 1400 implements a Single-Instruction, Multiple Thread (SIMT) architecture where each thread in a group of threads is configured to process a different set of data based on the same set of instructions, but where individual threads in the group of threads are allowed to diverge during execution. In an embodiment, a program counter, call stack, and execution state is maintained for each warp, enabling concurrency between warps and serial execution within warps when threads within the warp diverge. In another embodiment, a program counter, call stack, and execution state is maintained for each individual thread, enabling equal concurrency between all threads, within and between warps. When execution state is maintained for each individual thread, threads executing the same instructions may be converged and executed in parallel for maximum efficiency. The streaming multiprocessor 1400 will be described in more detail below in conjunction with FIG. 14.

The memory management unit 1216 provides an interface between the general processing cluster 1200 and the memory partition unit 1300. The memory management unit 1216 may provide translation of virtual addresses into physical addresses, memory protection, and arbitration of memory requests. In an embodiment, the memory management unit 1216 provides one or more translation lookaside buffers (TLBs) for performing translation of virtual addresses into physical addresses in the memory 1102.

FIG. 13 depicts a memory partition unit 1300 of the parallel processing unit 1100 of FIG. 11, in accordance with an embodiment. As shown in FIG. 13, the memory partition unit 1300 includes a raster operations unit 1302, a level two cache 1304, and a memory interface 1306. The memory interface 1306 is coupled to the memory 1102. Memory interface 1306 may implement 32, 64, 128, 1024-bit data buses, or the like, for high-speed data transfer. In an embodiment, the parallel processing unit 1100 incorporates U memory interface 1306 modules, one memory interface 1306 per pair of memory partition unit 1300 modules, where each pair of memory partition unit 1300 modules is connected to a corresponding memory 1102 device. For example, parallel processing unit 1100 may be connected to up to Y memory 1102 devices, such as high bandwidth memory stacks or graphics double-data-rate, version 5, synchronous dynamic random access memory, or other types of persistent storage.

In an embodiment, the memory interface 1306 implements an HBM2 memory interface and Y equals half U. In an embodiment, the HBM2 memory stacks are located on the same physical package as the parallel processing unit 1100, providing substantial power and area savings compared with conventional GDDR5 SDRAM systems. In an embodiment, each HBM2 stack includes four memory dies and Y equals 4, with HBM2 stack including two 128-bit channels per die for a total of 8 channels and a data bus width of 1024 bits.

In an embodiment, the memory 1102 supports Single-Error Correcting Double-Error Detecting (SECDED) Error Correction Code (ECC) to protect data. ECC provides higher reliability for compute applications that are sensitive to data corruption. Reliability is especially important in large-scale cluster computing environments where parallel processing unit 1100 modules process very large datasets and/or run applications for extended periods.

In an embodiment, the parallel processing unit 1100 implements a multi-level memory hierarchy. In an embodiment, the memory partition unit 1300 supports a unified memory to provide a single unified virtual address space for CPU and parallel processing unit 1100 memory, enabling data sharing between virtual memory systems. In an embodiment the frequency of accesses by a parallel processing unit 1100 to memory located on other processors is traced to ensure that memory pages are moved to the physical memory of the parallel processing unit 1100 that is accessing the pages more frequently. In an embodiment, the NVLink 1108 supports address translation services allowing the parallel processing unit 1100 to directly access a CPU's page tables and providing full access to CPU memory by the parallel processing unit 1100.

In an embodiment, copy engines transfer data between multiple parallel processing unit 1100 modules or between parallel processing unit 1100 modules and CPUs. The copy engines can generate page faults for addresses that are not mapped into the page tables. The memory partition unit 1300 can then service the page faults, mapping the addresses into the page table, after which the copy engine can perform the transfer. In a conventional system, memory is pinned (e.g., non-pageable) for multiple copy engine operations between multiple processors, substantially reducing the available memory. With hardware page faulting, addresses can be passed to the copy engines without worrying if the memory pages are resident, and the copy process is transparent.

Data from the memory 1102 or other system memory may be fetched by the memory partition unit 1300 and stored in the level two cache 1304, which is located on-chip and is shared between the various general processing cluster 1200 modules. As shown, each memory partition unit 1300 includes a portion of the level two cache 1304 associated with a corresponding memory 1102 device. Lower level caches may then be implemented in various units within the general processing cluster 1200 modules. For example, each of the streaming multiprocessor 1400 modules may implement an L1 cache. The L1 cache is private memory that is dedicated to a particular streaming multiprocessor 1400. Data from the level two cache 1304 may be fetched and stored in each of the L1 caches for processing in the functional units of the streaming multiprocessor 1400 modules. The level two cache 1304 is coupled to the memory interface 1306 and the crossbar 1118.

The raster operations unit 1302 performs graphics raster operations related to pixel color, such as color compression, pixel blending, and the like. The raster operations unit 1302 also implements depth testing in conjunction with the raster engine 1208, receiving a depth for a sample location associated with a pixel fragment from the culling engine of the raster engine 1208. The depth is tested against a corresponding depth in a depth buffer for a sample location associated with the fragment. If the fragment passes the depth test for the sample location, then the raster operations unit 1302 updates the depth buffer and transmits a result of the depth test to the raster engine 1208. It will be appreciated that the number of partition memory partition unit 1300 modules may be different than the number of general processing cluster 1200 modules and, therefore, each raster operations unit 1302 may be coupled to each of the general processing cluster 1200 modules. The raster operations unit 1302 tracks packets received from the different general processing cluster 1200 modules and determines which general processing cluster 1200 that a result generated by the raster operations unit 1302 is routed to through the crossbar 1118. Although the raster operations unit 1302 is included within the memory partition unit 1300 in FIG. 13, in other embodiment, the raster operations unit 1302 may be outside of the memory partition unit 1300. For example, the raster operations unit 1302 may reside in the general processing cluster 1200 or another unit.

Figure 14:
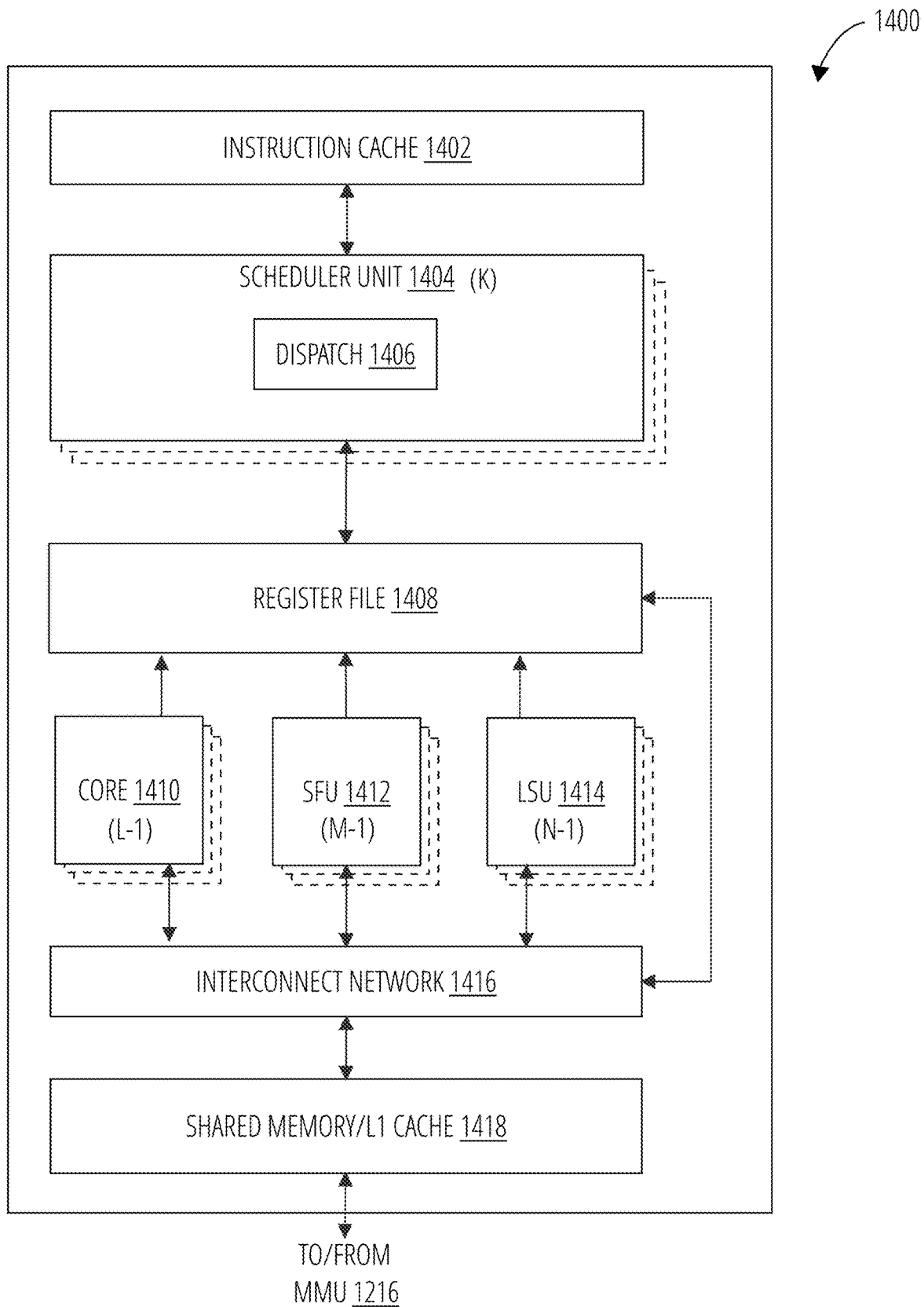
FIG. 14 depicts a streaming multiprocessor 1400 in accordance with one embodiment.

FIG. 14 illustrates the streaming multiprocessor 1400 of FIG. 12, in accordance with an embodiment. As shown in FIG. 14, the streaming multiprocessor 1400 includes an instruction cache 1402, one or more scheduler unit 1404 modules (e.g., such as scheduler unit 1112), a register file 1408, one or more processing core 1410 modules, one or more special function unit 1412 modules, one or more load/store unit 1414 modules, an interconnect network 1416, and a shared memory/L1 cache 1418.

As described above, the work distribution unit 1114 dispatches tasks for execution on the general processing cluster 1200 modules of the parallel processing unit 1100. The tasks are allocated to a particular data processing cluster 1206 within a general processing cluster 1200 and, if the task is associated with a shader program, the task may be allocated to a streaming multiprocessor 1400. The scheduler unit 1112 receives the tasks from the work distribution unit 1114 and manages instruction scheduling for one or more thread blocks assigned to the streaming multiprocessor 1400. The scheduler unit 1404 schedules thread blocks for execution as warps of parallel threads, where each thread block is allocated at least one warp. In an embodiment, each warp executes 32 threads. The scheduler unit 1404 may manage a plurality of different thread blocks, allocating the warps to the different thread blocks and then dispatching instructions from the plurality of different cooperative groups to the various functional units (e.g., core 1410 modules, special function unit 1412 modules, and load/store unit 1414 modules) during each clock cycle.

Cooperative Groups is a programming model for organizing groups of communicating threads that allows developers to express the granularity at which threads are communicating, enabling the expression of richer, more efficient parallel decompositions. Cooperative launch APIs support synchronization amongst thread blocks for the execution of parallel algorithms. Conventional programming models provide a single, simple construct for synchronizing cooperating threads: a barrier across all threads of a thread block (e.g., the syncthreads( ) function). However, programmers would often like to define groups of threads at smaller than thread block granularities and synchronize within the defined groups to enable greater performance, design flexibility, and software reuse in the form of collective group-wide function interfaces.

Cooperative Groups enables programmers to define groups of threads explicitly at sub-block (e.g., as small as a single thread) and multi-block granularities, and to perform collective operations such as synchronization on the threads in a cooperative group. The programming model supports clean composition across software boundaries, so that libraries and utility functions can synchronize safely within their local context without having to make assumptions about convergence. Cooperative Groups primitives enable new patterns of cooperative parallelism, including producer-consumer parallelism, opportunistic parallelism, and global synchronization across an entire grid of thread blocks.

A dispatch 1406 unit is configured within the scheduler unit 1404 to transmit instructions to one or more of the functional units. In one embodiment, the scheduler unit 1404 includes two dispatch 1406 units that enable two different instructions from the same warp to be dispatched during each clock cycle. In alternative embodiments, each scheduler unit 1404 may include a single dispatch 1406 unit or additional dispatch 1406 units.

Each streaming multiprocessor 1400 includes a register file 1408 that provides a set of registers for the functional units of the streaming multiprocessor 1400. In an embodiment, the register file 1408 is divided between each of the functional units such that each functional unit is allocated a dedicated portion of the register file 1408. In another embodiment, the register file 1408 is divided between the different warps being executed by the streaming multiprocessor 1400. The register file 1408 provides temporary storage for operands connected to the data paths of the functional units.

Each streaming multiprocessor 1400 comprises L processing core 1410 modules. In an embodiment, the streaming multiprocessor 1400 includes a large number (e.g., 128, etc.) of distinct processing core 1410 modules. Each core 1410 may include a fully-pipelined, single-precision, double-precision, and/or mixed precision processing unit that includes a floating point arithmetic logic unit and an integer arithmetic logic unit. In an embodiment, the floating point arithmetic logic units implement the IEEE 754-2008 standard for floating point arithmetic. In an embodiment, the core 1410 modules include 64 single-precision (32-bit) floating point cores, 64 integer cores, 32 double-precision (64-bit) floating point cores, and 8 tensor cores.

Tensor cores configured to perform matrix operations, and, in an embodiment, one or more tensor cores are included in the core 1410 modules. In particular, the tensor cores are configured to perform deep learning matrix arithmetic, such as convolution operations for neural network training and inferencing. In an embodiment, each tensor core operates on a 4×4 matrix and performs a matrix multiply and accumulate operation D=A'B+C, where A, B, C, and D are 4×4 matrices.

In an embodiment, the matrix multiply inputs A and B are 16-bit floating point matrices, while the accumulation matrices C and D may be 16-bit floating point or 32-bit floating point matrices. Tensor Cores operate on 16-bit floating point input data with 32-bit floating point accumulation. The 16-bit floating point multiply requires 64 operations and results in a full precision product that is then accumulated using 32-bit floating point addition with the other intermediate products for a 4×4×4 matrix multiply. In practice, Tensor Cores are used to perform much larger two-dimensional or higher dimensional matrix operations, built up from these smaller elements. An API, such as CUDA 9 C++ API, exposes specialized matrix load, matrix multiply and accumulate, and matrix store operations to efficiently use Tensor Cores from a CUDA-C++ program. At the CUDA level, the warp-level interface assumes 16×16 size matrices spanning all 32 threads of the warp.

Each streaming multiprocessor 1400 also comprises M special function unit 1412 modules that perform special functions (e.g., attribute evaluation, reciprocal square root, and the like). In an embodiment, the special function unit 1412 modules may include a tree traversal unit configured to traverse a hierarchical tree data structure. In an embodiment, the special function unit 1412 modules may include texture unit configured to perform texture map filtering operations. In an embodiment, the texture units are configured to load texture maps (e.g., a 2D array of texels) from the memory 1102 and sample the texture maps to produce sampled texture values for use in shader programs executed by the streaming multiprocessor 1400. In an embodiment, the texture maps are stored in the shared memory/L1 cache 1418. The texture units implement texture operations such as filtering operations using mip-maps (e.g., texture maps of varying levels of detail). In an embodiment, each streaming multiprocessor 1400 includes two texture units.

Each streaming multiprocessor 1400 also comprises N load/store unit 1414 modules that implement load and store operations between the shared memory/L1 cache 1418 and the register file 1408. Each streaming multiprocessor 1400 includes an interconnect network 1416 that connects each of the functional units to the register file 1408 and the load/store unit 1414 to the register file 1408 and shared memory/L1 cache 1418. In an embodiment, the interconnect network 1416 is a crossbar that can be configured to connect any of the functional units to any of the registers in the register file 1408 and connect the load/store unit 1414 modules to the register file 1408 and memory locations in shared memory/L1 cache 1418.

The shared memory/L1 cache 1418 is an array of on-chip memory that allows for data storage and communication between the streaming multiprocessor 1400 and the primitive engine 1212 and between threads in the streaming multiprocessor 1400. In an embodiment, the shared memory/L1 cache 1418 comprises 128 KB of storage capacity and is in the path from the streaming multiprocessor 1400 to the memory partition unit 1300. The shared memory/L1 cache 1418 can be used to cache reads and writes. One or more of the shared memory/L1 cache 1418, level two cache 1304, and memory 1102 are backing stores.

Combining data cache and shared memory functionality into a single memory block provides the best overall performance for both types of memory accesses. The capacity is usable as a cache by programs that do not use shared memory. For example, if shared memory is configured to use half of the capacity, texture and load/store operations can use the remaining capacity. Integration within the shared memory/L1 cache 1418 enables the shared memory/L1 cache 1418 to function as a high-throughput conduit for streaming data while simultaneously providing high-bandwidth and low-latency access to frequently reused data.

When configured for general purpose parallel computation, a simpler configuration can be used compared with graphics processing. Specifically, the fixed function graphics processing units shown in FIG. 11, are bypassed, creating a much simpler programming model. In the general purpose parallel computation configuration, the work distribution unit 1114 assigns and distributes blocks of threads directly to the data processing cluster 1206 modules. The threads in a block execute the same program, using a unique thread ID in the calculation to ensure each thread generates unique results, using the streaming multiprocessor 1400 to execute the program and perform calculations, shared memory/L1 cache 1418 to communicate between threads, and the load/store unit 1414 to read and write global memory through the shared memory/L1 cache 1418 and the memory partition unit 1300. When configured for general purpose parallel computation, the streaming multiprocessor 1400 can also write commands that the scheduler unit 1112 can use to launch new work on the data processing cluster 1206 modules.

The parallel processing unit 1100 may be included in a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, and the like. In an embodiment, the parallel processing unit 1100 is embodied on a single semiconductor substrate. In another embodiment, the parallel processing unit 1100 is included in a system-on-a-chip (SoC) along with one or more other devices such as additional parallel processing unit 1100 modules, the memory 1102, a reduced instruction set computer (RISC) CPU, a memory management unit (MMU), a digital-to-analog converter (DAC), and the like.

In an embodiment, the parallel processing unit 1100 may be included on a graphics card that includes one or more memory devices. The graphics card may be configured to interface with a PCIe slot on a motherboard of a desktop computer. In yet another embodiment, the parallel processing unit 1100 may be an integrated graphics processing unit (iGPU) or parallel processor included in the chipset of the motherboard.

Exemplary Computing System

Systems with multiple GPUs and CPUs are used in a variety of industries as developers expose and leverage more parallelism in applications such as artificial intelligence computing. High-performance GPU-accelerated systems with tens to many thousands of compute nodes are deployed in data centers, research facilities, and supercomputers to solve ever larger problems. As the number of processing devices within the high-performance systems increases, the communication and data transfer mechanisms need to scale to support the increased bandwidth.

Figure 15:
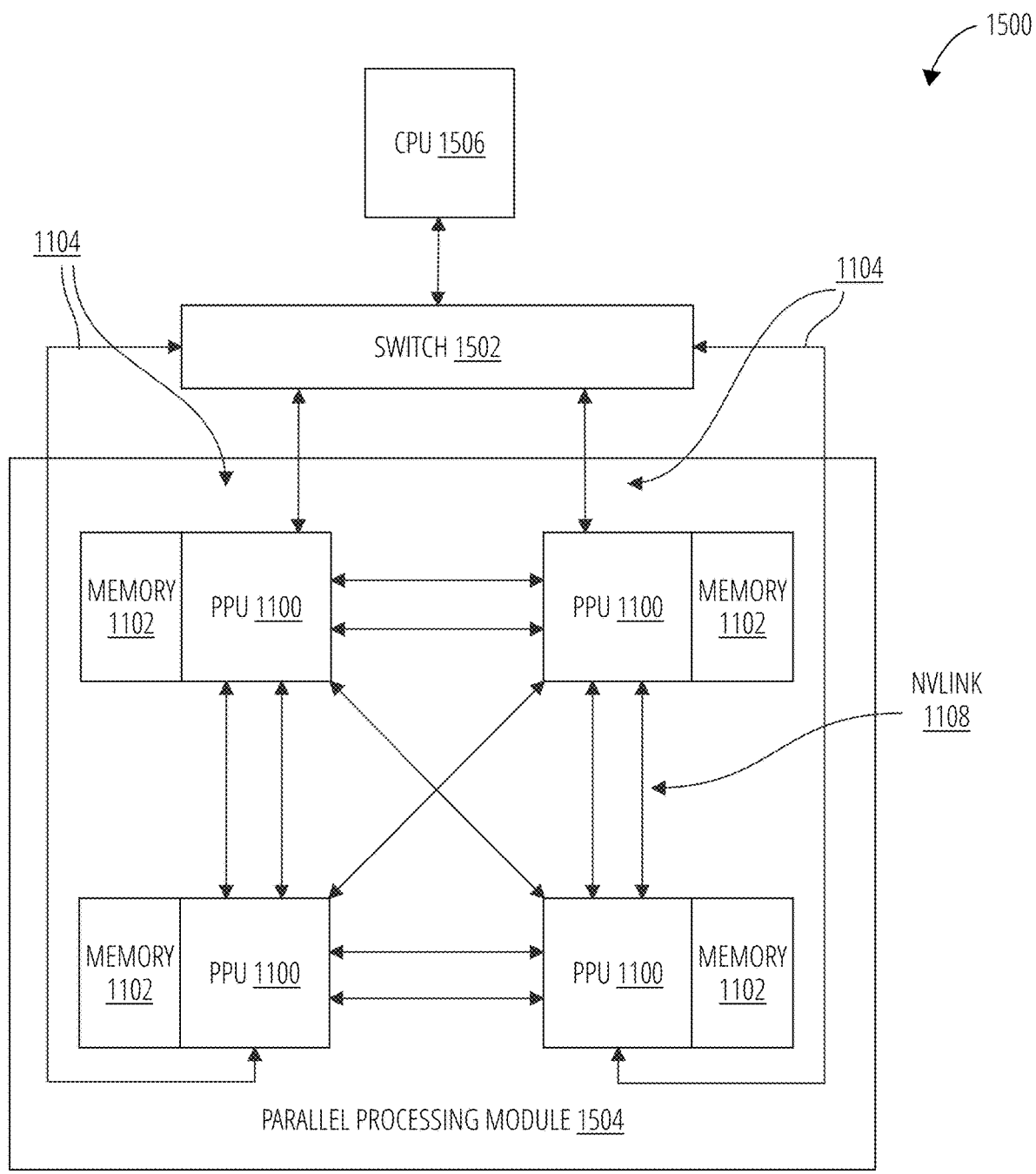
FIG. 15 depicts a processing system 1500 in accordance with one embodiment.

FIG. 15 is a conceptual diagram of a processing system 1500 implemented using the parallel processing unit 1100 of FIG. 11, in accordance with an embodiment. The processing system 1500 includes a central processing unit 1506, switch 1502, and multiple parallel processing unit 1100 modules each and respective memory 1102 modules. The NVLink 1108 provides high-speed communication links between each of the parallel processing unit 1100 modules. Although a particular number of NVLink 1108 and interconnect 1104 connections are illustrated in FIG. 15, the number of connections to each parallel processing unit 1100 and the central processing unit 1506 may vary. The switch 1502 interfaces between the interconnect 1104 and the central processing unit 1506. The parallel processing unit 1100 modules, memory 1102 modules, and NVLink 1108 connections may be situated on a single semiconductor platform to form a parallel processing module 1504. In an embodiment, the switch 1502 supports two or more protocols to interface between various different connections and/or links.

In another embodiment (not shown), the NVLink 1108 provides one or more high-speed communication links between each of the parallel processing unit 1100 modules and the central processing unit 1506 and the switch 1502 interfaces between the interconnect 1104 and each of the parallel processing unit 1100 modules. The parallel processing unit 1100 modules, memory 1102 modules, and interconnect 1104 may be situated on a single semiconductor platform to form a parallel processing module 1504. In yet another embodiment (not shown), the interconnect 1104 provides one or more communication links between each of the parallel processing unit 1100 modules and the central processing unit 1506 and the switch 1502 interfaces between each of the parallel processing unit 1100 modules using the NVLink 1108 to provide one or more high-speed communication links between the parallel processing unit 1100 modules. In another embodiment (not shown), the NVLink 1108 provides one or more high-speed communication links between the parallel processing unit 1100 modules and the central processing unit 1506 through the switch 1502. In yet another embodiment (not shown), the interconnect 1104 provides one or more communication links between each of the parallel processing unit 1100 modules directly. One or more of the NVLink 1108 high-speed communication links may be implemented as a physical NVLink interconnect or either an on-chip or on-die interconnect using the same protocol as the NVLink 1108.

In the context of the present description, a single semiconductor platform may refer to a sole unitary semiconductor-based integrated circuit fabricated on a die or chip. It should be noted that the term single semiconductor platform may also refer to multi-chip modules with increased connectivity which simulate on-chip operation and make substantial improvements over utilizing a conventional bus implementation. Of course, the various circuits or devices may also be situated separately or in various combinations of semiconductor platforms per the desires of the user. Alternately, the parallel processing module 1504 may be implemented as a circuit board substrate and each of the parallel processing unit 1100 modules and/or memory 1102 modules may be packaged devices. In an embodiment, the central processing unit 1506, switch 1502, and the parallel processing module 1504 are situated on a single semiconductor platform.

In an embodiment, the signaling rate of each NVLink 1108 is 20 to 25 Gigabits/second and each parallel processing unit 1100 includes six NVLink 1108 interfaces (as shown in FIG. 15, five NVLink 1108 interfaces are included for each parallel processing unit 1100). Each NVLink 1108 provides a data transfer rate of 25 Gigabytes/second in each direction, with six links providing 300 Gigabytes/second. The NVLink 1108 can be used exclusively for PPU-to-PPU communication as shown in FIG. 15, or some combination of PPU-to-PPU and PPU-to-CPU, when the central processing unit 1506 also includes one or more NVLink 1108 interfaces.

In an embodiment, the NVLink 1108 allows direct load/store/atomic access from the central processing unit 1506 to each parallel processing unit 1100 module's memory 1102. In an embodiment, the NVLink 1108 supports coherency operations, allowing data read from the memory 1102 modules to be stored in the cache hierarchy of the central processing unit 1506, reducing cache access latency for the central processing unit 1506. In an embodiment, the NVLink 1108 includes support for Address Translation Services (ATS), allowing the parallel processing unit 1100 to directly access page tables within the central processing unit 1506. One or more of the NVLink 1108 may also be configured to operate in a low-power mode.

Figure 16:
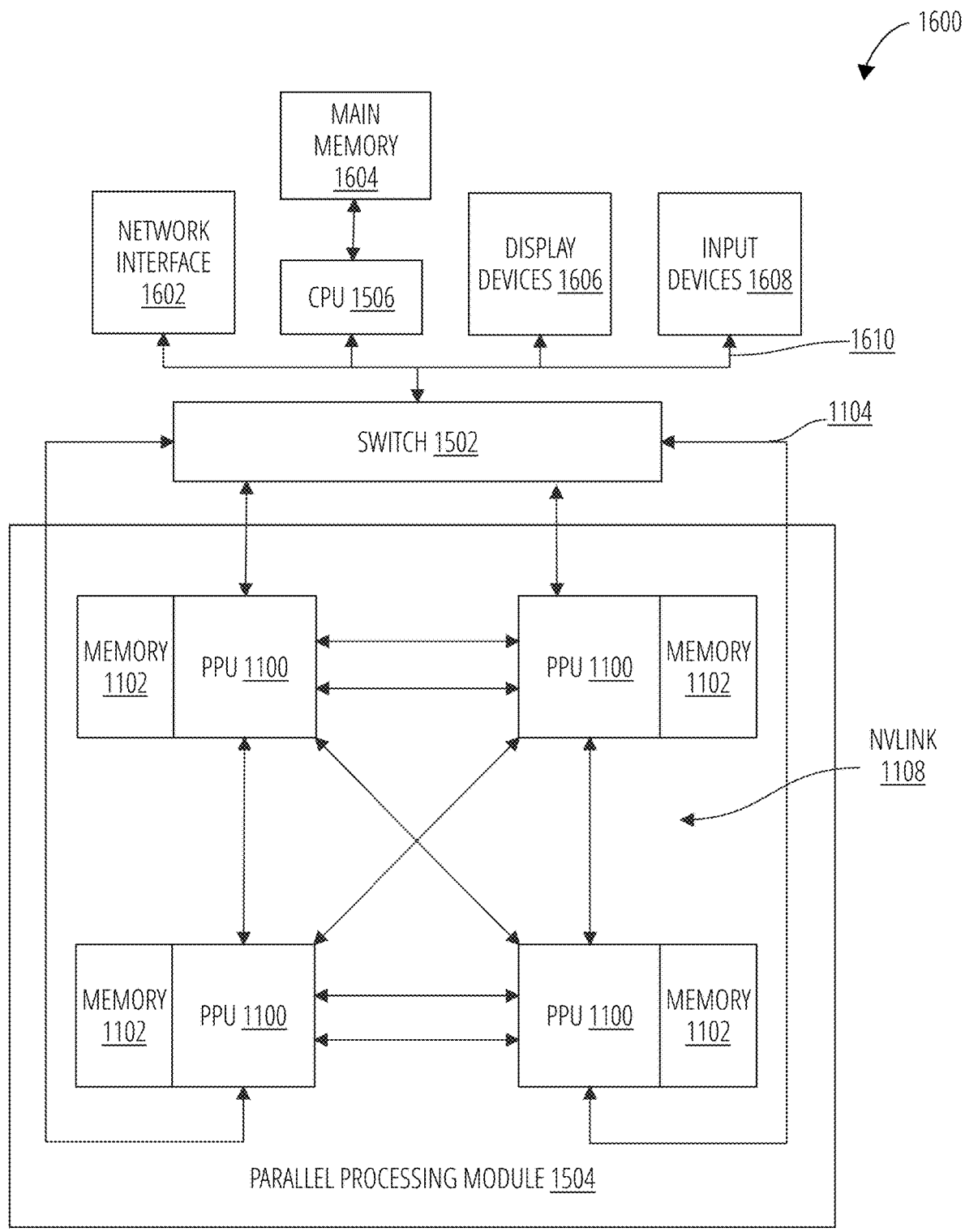
FIG. 16 depicts an exemplary processing system 1600 in accordance with another embodiment.

FIG. 16 depicts an exemplary processing system 1600 in which the various architecture and/or functionality of the various previous embodiments may be implemented. As shown, an exemplary processing system 1600 is provided including at least one central processing unit 1506 that is connected to a communications bus 1610. The communication communications bus 1610 may be implemented using any suitable protocol, such as PCI (Peripheral Component Interconnect), PCI-Express, AGP (Accelerated Graphics Port), HyperTransport, or any other bus or point-to-point communication protocol(s). The exemplary processing system 1600 also includes a main memory 1604. Control logic (software) and data are stored in the main memory 1604 which may take the form of random access memory (RAM).

The exemplary processing system 1600 also includes input devices 1608, the parallel processing module 1504, and display devices 1606, e.g. a conventional CRT (cathode ray tube), LCD (liquid crystal display), LED (light emitting diode), plasma display or the like. User input may be received from the input devices 1608, e.g., keyboard, mouse, touchpad, microphone, and the like. Each of the foregoing modules and/or devices may even be situated on a single semiconductor platform to form the exemplary processing system 1600. Alternately, the various modules may also be situated separately or in various combinations of semiconductor platforms per the desires of the user.

Further, the exemplary processing system 1600 may be coupled to a network (e.g., a telecommunications network, local area network (LAN), wireless network, wide area network (WAN) such as the Internet, peer-to-peer network, cable network, or the like) through a network interface 1602 for communication purposes.

The exemplary processing system 1600 may also include a secondary storage (not shown). The secondary storage includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 1604 and/or the secondary storage. Such computer programs, when executed, enable the exemplary processing system 1600 to perform various functions. The main memory 1604, the storage, and/or any other storage are possible examples of computer-readable media.

The architecture and/or functionality of the various previous figures may be implemented in the context of a general computer system, a circuit board system, a game console system dedicated for entertainment purposes, an application-specific system, and/or any other desired system. For example, the exemplary processing system 1600 may take the form of a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, a mobile phone device, a television, workstation, game consoles, embedded system, and/or any other type of logic.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

Graphics Processing Pipeline

FIG. 16 is a conceptual diagram of a graphics processing pipeline 1700 implemented by the parallel processing unit 1100 of FIG. 11, in accordance with an embodiment. In an embodiment, the parallel processing unit 1100 comprises a graphics processing unit (GPU). The parallel processing unit 1100 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The parallel processing unit 1100 can be configured to process the graphics primitives to generate a frame buffer (e.g., pixel data for each of the pixels of the display).

An application writes model data for a scene (e.g., a collection of vertices and attributes) to a memory such as a system memory or memory 1102. The model data defines each of the objects that may be visible on a display. The application then makes an API call to the driver kernel that requests the model data to be rendered and displayed. The driver kernel reads the model data and writes commands to the one or more streams to perform operations to process the model data. The commands may reference different shader programs to be implemented on the streaming multiprocessor 1400 modules of the parallel processing unit 1100 including one or more of a vertex shader, hull shader, domain shader, geometry shader, and a pixel shader. For example, one or more of the streaming multiprocessor 1400 modules may be configured to execute a vertex shader program that processes a number of vertices defined by the model data. In an embodiment, the different streaming multiprocessor 1400 modules may be configured to execute different shader programs concurrently. For example, a first subset of streaming multiprocessor 1400 modules may be configured to execute a vertex shader program while a second subset of streaming multiprocessor 1400 modules may be configured to execute a pixel shader program. The first subset of streaming multiprocessor 1400 modules processes vertex data to produce processed vertex data and writes the processed vertex data to the level two cache 1304 and/or the memory 1102. After the processed vertex data is rasterized (e.g., transformed from three-dimensional data into two-dimensional data in screen space) to produce fragment data, the second subset of streaming multiprocessor 1400 modules executes a pixel shader to produce processed fragment data, which is then blended with other processed fragment data and written to the frame buffer in memory 1102. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

The graphics processing pipeline 1700 is an abstract flow diagram of the processing steps implemented to generate 2D computer-generated images from 3D geometry data. As is well-known, pipeline architectures may perform long latency operations more efficiently by splitting up the operation into a plurality of stages, where the output of each stage is coupled to the input of the next successive stage. Thus, the graphics processing pipeline 1700 receives input data 601 that is transmitted from one stage to the next stage of the graphics processing pipeline 1700 to generate output data 1704. In an embodiment, the graphics processing pipeline 1700 may represent a graphics processing pipeline defined by the OpenGL® API. As an option, the graphics processing pipeline 1700 may be implemented in the context of the functionality and architecture of the previous Figures and/or any subsequent Figure(s).

Figure 17:
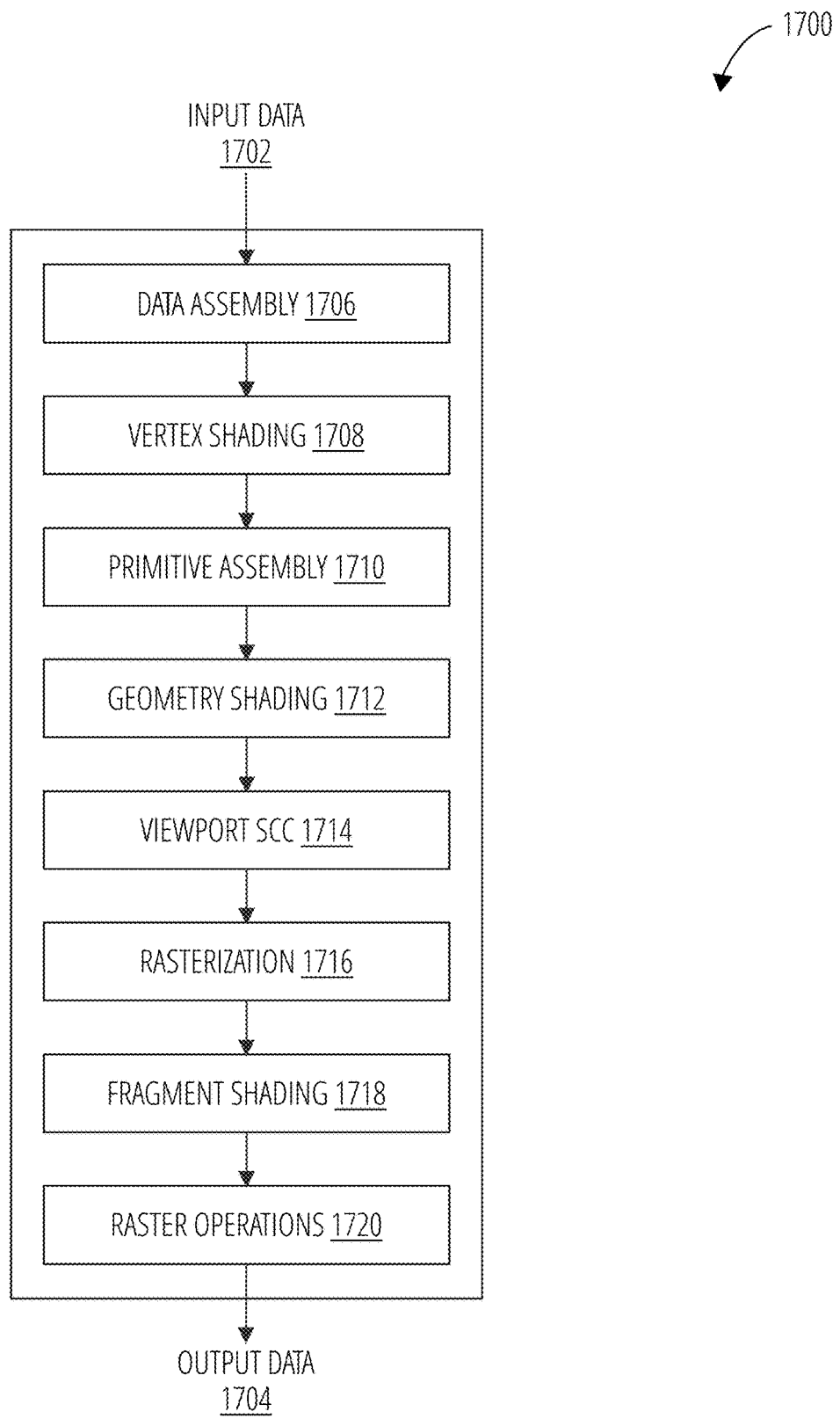
FIG. 17 depicts a graphics processing pipeline 1700 in accordance with one embodiment.

As shown in FIG. 17, the graphics processing pipeline 1700 comprises a pipeline architecture that includes a number of stages. The stages include, but are not limited to, a data assembly 1706 stage, a vertex shading 1708 stage, a primitive assembly 1710 stage, a geometry shading 1712 stage, a viewport SCC 1714 stage, a rasterization 1716 stage, a fragment shading 1718 stage, and a raster operations 1720 stage. In an embodiment, the input data 1702 comprises commands that configure the processing units to implement the stages of the graphics processing pipeline 1700 and geometric primitives (e.g., points, lines, triangles, quads, triangle strips or fans, etc.) to be processed by the stages. The output data 1704 may comprise pixel data (e.g., color data) that is copied into a frame buffer or other type of surface data structure in a memory.

The data assembly 1706 stage receives the input data 1702 that specifies vertex data for high-order surfaces, primitives, or the like. The data assembly 1706 stage collects the vertex data in a temporary storage or queue, such as by receiving a command from the host processor that includes a pointer to a buffer in memory and reading the vertex data from the buffer. The vertex data is then transmitted to the vertex shading 1708 stage for processing.

The vertex shading 1708 stage processes vertex data by performing a set of operations (e.g., a vertex shader or a program) once for each of the vertices. Vertices may be, e.g., specified as a 4-coordinate vector (e.g., <x, y, z, w>) associated with one or more vertex attributes (e.g., color, texture coordinates, surface normal, etc.). The vertex shading 1708 stage may manipulate individual vertex attributes such as position, color, texture coordinates, and the like. In other words, the vertex shading 1708 stage performs operations on the vertex coordinates or other vertex attributes associated with a vertex. Such operations commonly including lighting operations (e.g., modifying color attributes for a vertex) and transformation operations (e.g., modifying the coordinate space for a vertex). For example, vertices may be specified using coordinates in an object-coordinate space, which are transformed by multiplying the coordinates by a matrix that translates the coordinates from the object-coordinate space into a world space or a normalized-device-coordinate (NCD) space. The vertex shading 1708 stage generates transformed vertex data that is transmitted to the primitive assembly 1710 stage.

The primitive assembly 1710 stage collects vertices output by the vertex shading 1708 stage and groups the vertices into geometric primitives for processing by the geometry shading 1712 stage. For example, the primitive assembly 1710 stage may be configured to group every three consecutive vertices as a geometric primitive (e.g., a triangle) for transmission to the geometry shading 1712 stage. In some embodiments, specific vertices may be reused for consecutive geometric primitives (e.g., two consecutive triangles in a triangle strip may share two vertices). The primitive assembly 1710 stage transmits geometric primitives (e.g., a collection of associated vertices) to the geometry shading 1712 stage.

The geometry shading 1712 stage processes geometric primitives by performing a set of operations (e.g., a geometry shader or program) on the geometric primitives. Tessellation operations may generate one or more geometric primitives from each geometric primitive. In other words, the geometry shading 1712 stage may subdivide each geometric primitive into a finer mesh of two or more geometric primitives for processing by the rest of the graphics processing pipeline 1700. The geometry shading 1712 stage transmits geometric primitives to the viewport SCC 1714 stage.

In an embodiment, the graphics processing pipeline 1700 may operate within a streaming multiprocessor and the vertex shading 1708 stage, the primitive assembly 1710 stage, the geometry shading 1712 stage, the fragment shading 1718 stage, and/or hardware/software associated therewith, may sequentially perform processing operations. Once the sequential processing operations are complete, in an embodiment, the viewport SCC 1714 stage may utilize the data. In an embodiment, primitive data processed by one or more of the stages in the graphics processing pipeline 1700 may be written to a cache (e.g. L1 cache, a vertex cache, etc.). In this case, in an embodiment, the viewport SCC 1714 stage may access the data in the cache. In an embodiment, the viewport SCC 1714 stage and the rasterization 1716 stage are implemented as fixed function circuitry.

The viewport SCC 1714 stage performs viewport scaling, culling, and clipping of the geometric primitives. Each surface being rendered to is associated with an abstract camera position. The camera position represents a location of a viewer looking at the scene and defines a viewing frustum that encloses the objects of the scene. The viewing frustum may include a viewing plane, a rear plane, and four clipping planes. Any geometric primitive entirely outside of the viewing frustum may be culled (e.g., discarded) because the geometric primitive will not contribute to the final rendered scene. Any geometric primitive that is partially inside the viewing frustum and partially outside the viewing frustum may be clipped (e.g., transformed into a new geometric primitive that is enclosed within the viewing frustum. Furthermore, geometric primitives may each be scaled based on a depth of the viewing frustum. All potentially visible geometric primitives are then transmitted to the rasterization 1716 stage.

The rasterization 1716 stage converts the 3D geometric primitives into 2D fragments (e.g. capable of being utilized for display, etc.). The rasterization 1716 stage may be configured to utilize the vertices of the geometric primitives to setup a set of plane equations from which various attributes can be interpolated. The rasterization 1716 stage may also compute a coverage mask for a plurality of pixels that indicates whether one or more sample locations for the pixel intercept the geometric primitive. In an embodiment, z-testing may also be performed to determine if the geometric primitive is occluded by other geometric primitives that have already been rasterized. The rasterization 1716 stage generates fragment data (e.g., interpolated vertex attributes associated with a particular sample location for each covered pixel) that are transmitted to the fragment shading 1718 stage.

The fragment shading 1718 stage processes fragment data by performing a set of operations (e.g., a fragment shader or a program) on each of the fragments. The fragment shading 1718 stage may generate pixel data (e.g., color values) for the fragment such as by performing lighting operations or sampling texture maps using interpolated texture coordinates for the fragment. The fragment shading 1718 stage generates pixel data that is transmitted to the raster operations 1720 stage.

The raster operations 1720 stage may perform various operations on the pixel data such as performing alpha tests, stencil tests, and blending the pixel data with other pixel data corresponding to other fragments associated with the pixel. When the raster operations 1720 stage has finished processing the pixel data (e.g., the output data 1704), the pixel data may be written to a render target such as a frame buffer, a color buffer, or the like.

It will be appreciated that one or more additional stages may be included in the graphics processing pipeline 1700 in addition to or in lieu of one or more of the stages described above. Various implementations of the abstract graphics processing pipeline may implement different stages. Furthermore, one or more of the stages described above may be excluded from the graphics processing pipeline in some embodiments (such as the geometry shading 1712 stage). Other types of graphics processing pipelines are contemplated as being within the scope of the present disclosure. Furthermore, any of the stages of the graphics processing pipeline 1700 may be implemented by one or more dedicated hardware units within a graphics processor such as parallel processing unit 1100. Other stages of the graphics processing pipeline 1700 may be implemented by programmable hardware units such as the streaming multiprocessor 1400 of the parallel processing unit 1100.

The graphics processing pipeline 1700 may be implemented via an application executed by a host processor, such as a CPU. In an embodiment, a device driver may implement an application programming interface (API) that defines various functions that can be utilized by an application in order to generate graphical data for display. The device driver is a software program that includes a plurality of instructions that control the operation of the parallel processing unit 1100. The API provides an abstraction for a programmer that lets a programmer utilize specialized graphics hardware, such as the parallel processing unit 1100, to generate the graphical data without requiring the programmer to utilize the specific instruction set for the parallel processing unit 1100. The application may include an API call that is routed to the device driver for the parallel processing unit 1100. The device driver interprets the API call and performs various operations to respond to the API call. In some instances, the device driver may perform operations by executing instructions on the CPU. In other instances, the device driver may perform operations, at least in part, by launching operations on the parallel processing unit 1100 utilizing an input/output interface between the CPU and the parallel processing unit 1100. In an embodiment, the device driver is configured to implement the graphics processing pipeline 1700 utilizing the hardware of the parallel processing unit 1100.

Various programs may be executed within the parallel processing unit 1100 in order to implement the various stages of the graphics processing pipeline 1700. For example, the device driver may launch a kernel on the parallel processing unit 1100 to perform the vertex shading 1708 stage on one streaming multiprocessor 1400 (or multiple streaming multiprocessor 1400 modules). The device driver (or the initial kernel executed by the parallel processing unit 1100) may also launch other kernels on the parallel processing unit 1100 to perform other stages of the graphics processing pipeline 1700, such as the geometry shading 1712 stage and the fragment shading 1718 stage. In addition, some of the stages of the graphics processing pipeline 1700 may be implemented on fixed unit hardware such as a rasterizer or a data assembler implemented within the parallel processing unit 1100. It will be appreciated that results from one kernel may be processed by one or more intervening fixed function hardware units before being processed by a subsequent kernel on a streaming multiprocessor 1400.

Various functional operations described herein may be implemented in logic that is referred to using a noun or noun phrase reflecting said operation or function. For example, an association operation may be carried out by an "associator" or "correlator". Likewise, switching may be carried out by a "switch", selection by a "selector", and so on. "Logic" refers to machine memory circuits, non transitory machine readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter).

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "credit distribution circuit configured to distribute credits to a plurality of processor cores" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112(f) for that claim element. Accordingly, claims in this application that do not otherwise include the "means for" [performing a function] construct should not be interpreted under 35 U.S.C § 112(f).

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. For example, in a register file having eight registers, the terms "first register" and "second register" can be used to refer to any two of the eight registers, and not, for example, just logical registers 0 and 1.

When used in the claims, the term "or" is used as an inclusive or and not as an exclusive or. For example, the phrase "at least one of x, y, or z" means any one of x, y, and z, as well as any combination thereof.

Having thus described illustrative embodiments in detail, it will be apparent that modifications and variations are possible without departing from the scope of the invention as claimed. The scope of inventive subject matter is not limited to the depicted embodiments but is rather set forth in the following Claims.

What is claimed is:

1. A method comprising:
   selecting a per-tile sampling order from among a plurality of different sampling orders for each tile of a plurality of tiles of a video frame;
   the selection of the per-tile sampling order based on one or both of a motion vector and neighboring pixels for the tile;
   generating a subframe for each pixel position in the tile, resulting in a plurality of subframes; and
   combining the subframes into a rendering of the video frame.

2. The method of claim 1, wherein the selection of the per-tile sampling order is based on both of the motion vector and the neighboring pixels for the tile.

3. The method of claim 1, wherein the selection of the per-tile sampling order is based on the motion vector and not on the neighboring pixels for the tile.

4. The method of claim 1, wherein the selection of the per-tile sampling order is based on the neighboring pixels for the tile and not on the motion vector.

5. The method of claim 1, further comprising:
selecting the per-tile sampling order from among a bowtie sampling order and an hourglass sampling order.

6. The method of claim 1 further comprising:
selecting the per-tile sampling order based on an angle of the motion vector.

7. The method of claim 1 further comprising:
selecting the per-tile sampling order based on a length of the motion vector.

8. The method of claim 7 further comprising:
selecting the per-tile sampling order based on a fractional portion of the length of the motion vector.

9. The method of claim 1 further comprising:
selecting the per-tile sampling order based on an angle of the motion vector and a fractional portion of a length of the motion vector.

10. The method of claim 1 wherein each tile is a 2×2 block of pixels.

11. The method of claim 1 further comprising:
selecting a supersampling pattern for pixels in the tile based on the motion vector.

12. A non-transitory computer-readable storage medium, the computer-readable storage medium including instructions that configure a computer to:
select a ray tracing pixel sampling order for each tile of a plurality of tiles in a video frame; and
varying the pixel sampling order between a first sampling order and a second sampling order for different tiles of the video frame based on an angle of at least one motion vector for the different tiles.

13. The computer-readable storage medium of claim 12, wherein the first sampling order is a bowtie sampling order and the second sampling order is an hourglass sampling order.

14. The computer-readable storage medium of claim 12 wherein the instructions further configure the computer to render a different subframe for each position in a selected pixel sampling order.

15. The computer-readable storage medium of claim 14 wherein there are four pixel positions in the selected sampling order.

16. The computer-readable storage medium of claim 14 wherein the different subframes combine to generate a rendered frame.

17. The computer-readable storage medium of claim 12 wherein the instructions further configure the computer to select the sampling order based a length of the motion vector.

18. The computer-readable storage medium of claim 17 wherein:
selection of the pixel sampling order is based on an angle of the motion vector for one or more first ranges of the angle; and
selection of the pixel sampling order is random for one or more second ranges of the angle.

19. The computer-readable storage medium of claim 12 wherein the instructions further configure the computer to select a supersampling jitter pattern for static pixels in the tiles and a centric-based supersampling pattern for dynamic pixels in the tiles.

20. A computing apparatus, the computing apparatus comprising:
a processor; and
a memory storing instructions that, when executed by the processor, configure the apparatus to:
select a sampling order comprising one of a bowtie sampling order and an hourglass sampling order for a ray trace of pixels in a tile having a width W and a height H; and
for each of W*H pixels in the tile, generate a subframe comprising only pixels from position j from each of the tiles.

21. The computing apparatus of claim 20 wherein selection of the sampling order is based on an angle of a motion vector derived for the tile for at least one range of the angle.

22. The computing apparatus of claim 21 wherein selection of the sampling order is further based on a fractional portion of a length of the motion vector.

23. The computing apparatus of claim 21 where selection of the sampling order is random for at least one other range of the angle.

24. A computing apparatus, the computing apparatus comprising:
a processor; and
a memory storing instructions that, when executed by the processor, configure the apparatus to:
select a sampling order comprising one of a first ray trace sampling order and a second ray trace sampling order on a per-tile basis for each of a plurality of tiles of a video frame;
each of the first sampling order and the second sampling order comprising N pixel sample positions;
generate N subframes each comprising only pixels from a same pixel sample position in each of the tiles; and
update the sampling order selection once per the generation of N subframes.

* * * * *